(12) United States Patent
Braedt

(10) Patent No.: US 10,451,165 B2
(45) Date of Patent: Oct. 22, 2019

(54) CHAINRING

(71) Applicant: SRAM Deutschland GmbH, Schweinfurt (DE)

(72) Inventor: Henrik Braedt, Hambach (DE)

(73) Assignee: SRAM DEUTSCHLAND, GMBH, Schweinfurt (DE)

( * ) Notice: Subject to any disclaimer, the term of this patent is extended or adjusted under 35 U.S.C. 154(b) by 371 days.

(21) Appl. No.: 15/380,277

(22) Filed: Dec. 15, 2016

(65) Prior Publication Data

US 2017/0167590 A1  Jun. 15, 2017

(30) Foreign Application Priority Data

Dec. 15, 2015 (DE) .......... 10 2015 016 263

(51) Int. Cl.
| | |
|---|---|
| *F16H 55/12* | (2006.01) |
| *B62M 1/36* | (2013.01) |
| *B62M 9/12* | (2006.01) |
| *F16H 9/24* | (2006.01) |
| *F16H 55/30* | (2006.01) |
| *B62M 9/14* | (2006.01) |
| *B62M 9/08* | (2006.01) |

(52) U.S. Cl.
CPC ............. *F16H 55/12* (2013.01); *B62M 1/36* (2013.01); *B62M 9/12* (2013.01); *B62M 9/14* (2013.01); *F16H 9/24* (2013.01); *F16H 55/30* (2013.01); *B62M 9/08* (2013.01)

(58) Field of Classification Search
USPC .................... 474/160, 80, 47, 152
See application file for complete search history.

(56) References Cited

U.S. PATENT DOCUMENTS

| | | | | |
|---|---|---|---|---|
| 4,127,038 | A * | 11/1978 | Browning | B62M 9/10 280/236 |
| 5,205,794 | A * | 4/1993 | Browning | B62M 9/14 474/160 |
| 6,173,982 | B1 * | 1/2001 | Westergard | B62M 9/085 280/261 |
| 7,156,764 | B2 * | 1/2007 | Mercat | B62M 9/08 474/152 |
| 7,611,430 | B2 * | 11/2009 | Matsumoto | B62M 9/00 474/80 |
| 7,744,498 | B2 | 6/2010 | Matsumoto et al. | |
| 8,342,553 | B2 * | 1/2013 | Patterson | B62M 11/145 280/259 |
| 9,499,233 | B2 * | 11/2016 | Schuster | B62M 9/08 |
| 9,714,067 | B1 * | 7/2017 | Hara | B62M 9/122 |
| 9,725,132 | B2 * | 8/2017 | Hara | B62M 1/36 |
| 9,944,347 | B2 * | 4/2018 | Cooke | B62M 1/36 |

(Continued)

FOREIGN PATENT DOCUMENTS

| | | |
|---|---|---|
| CH | 6517992 | 6/1980 |
| DE | 3141296 | 4/1983 |

(Continued)

*Primary Examiner* — Henry Y Liu

(57) ABSTRACT

A chainring includes a first chainring segment and a second chainring segment for a chainring arrangement of a bicycle. Further provided is a chainring arrangement and a drive arrangement for a bicycle with at least one chainring. The segmented chainring arrangement is particularly suitable for bicycles with only one front chainring.

21 Claims, 19 Drawing Sheets

(56) References Cited

U.S. PATENT DOCUMENTS

| | | | | |
|---|---|---|---|---|
| 2002/0084618 A1* | 7/2002 | Lerman | ............ | B62M 1/36 |
| | | | | 280/261 |
| 2005/0176537 A1* | 8/2005 | Matsumoto | ......... | B62M 9/121 |
| | | | | 474/80 |
| 2013/0008282 A1* | 1/2013 | Johnson | ............ | B62M 3/00 |
| | | | | 74/594.2 |
| 2014/0248982 A1* | 9/2014 | Schuster | ........... | B62M 9/08 |
| | | | | 474/69 |
| 2015/0274253 A1* | 10/2015 | Hara | ............ | B62M 1/36 |
| | | | | 74/594.2 |

FOREIGN PATENT DOCUMENTS

| | | |
|---|---|---|
| DE | 3427126 | 4/1985 |
| DE | 3838359 | 5/1990 |
| DE | 3941119 | 6/1991 |
| DE | 4129198 | 3/1993 |
| DE | 202009013652 | 1/2010 |
| DE | 102013015946 A1 | 3/2014 |
| DE | 102015104670 | 10/2015 |
| FR | 940978 | 12/1948 |
| FR | 983303 | 6/1951 |
| FR | 2881199 | 7/2006 |
| FR | 2903652 | 1/2008 |
| GB | 510474 A | 8/1939 |
| TW | 201536625 | 10/2015 |
| WO | 2013013256 | 1/2013 |
| WO | 2015075582 | 5/2015 |

\* cited by examiner

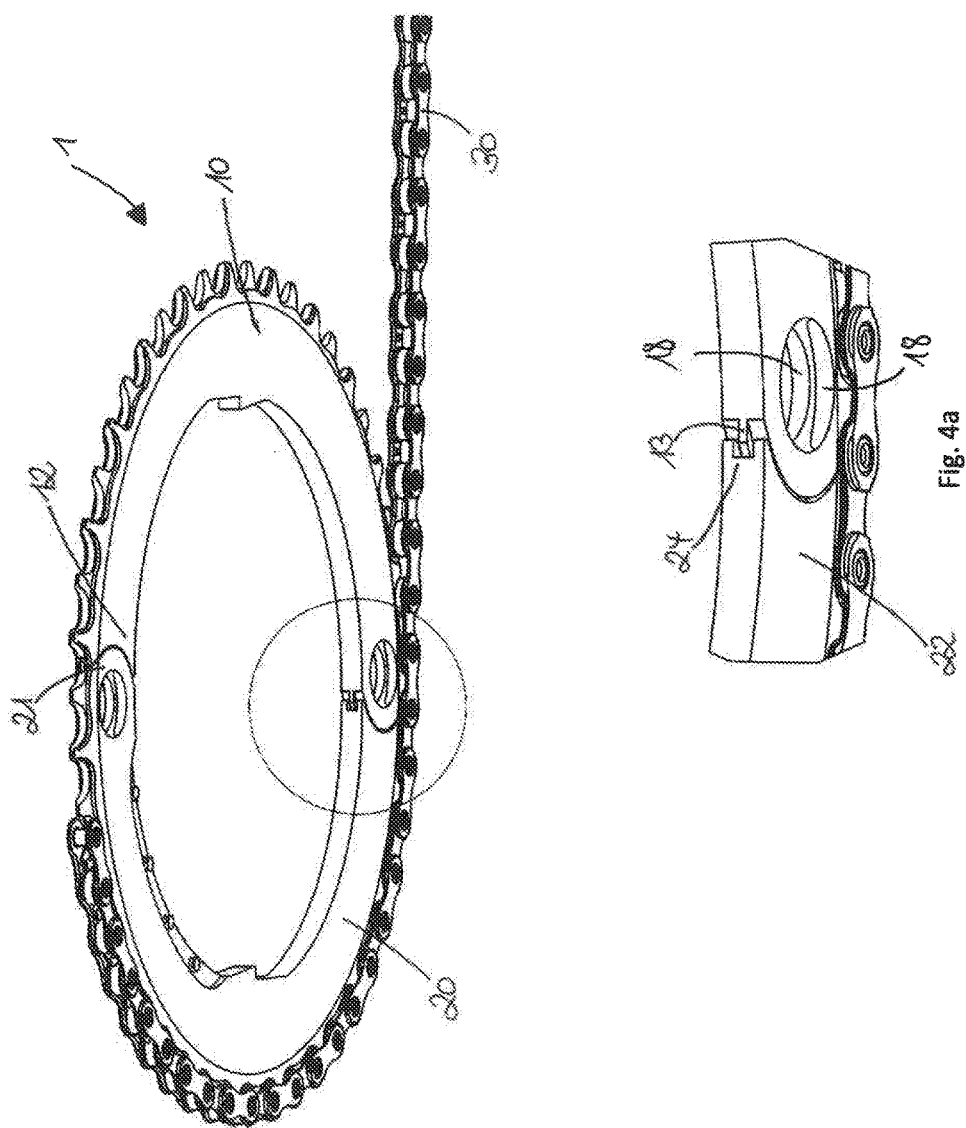

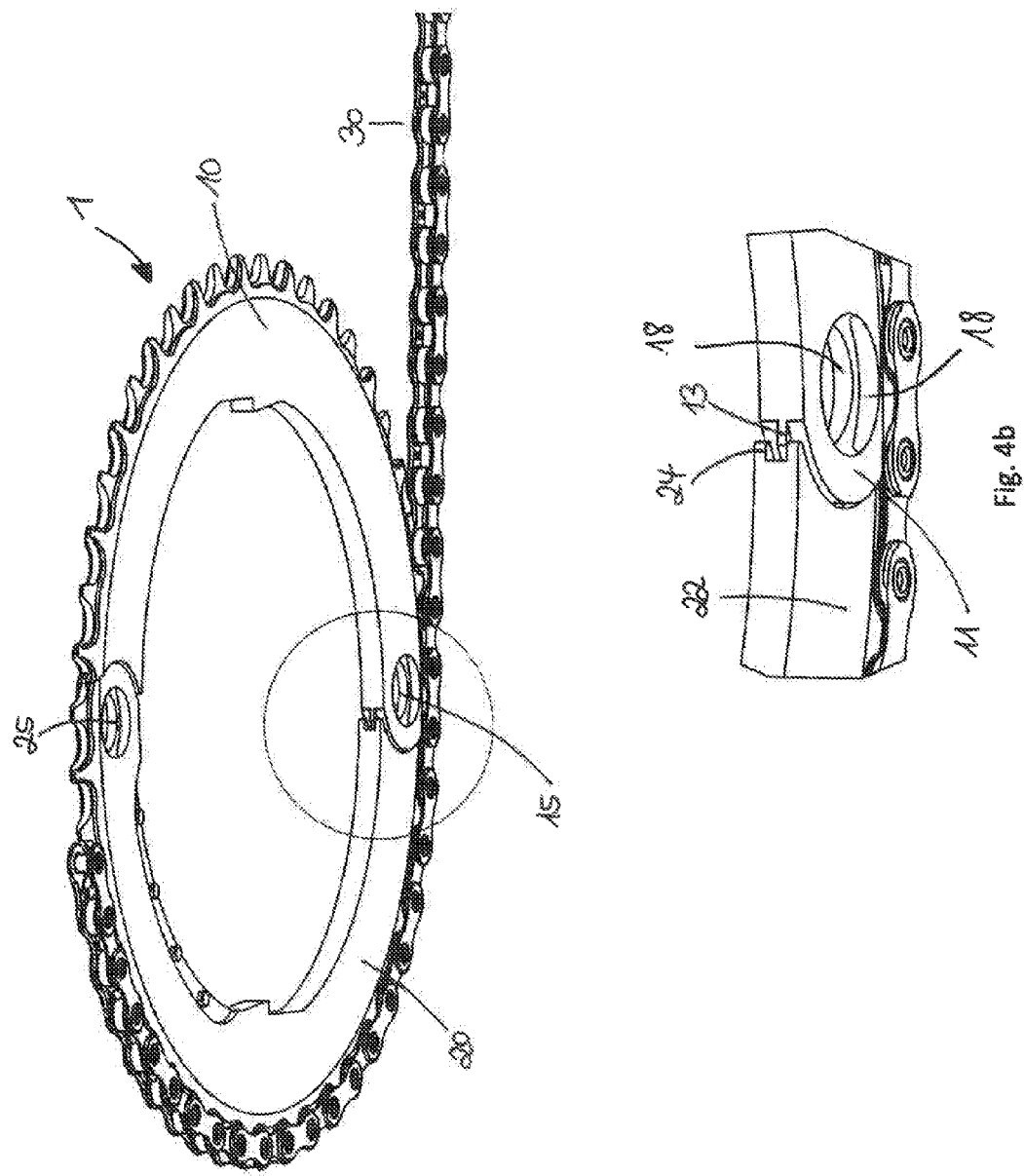

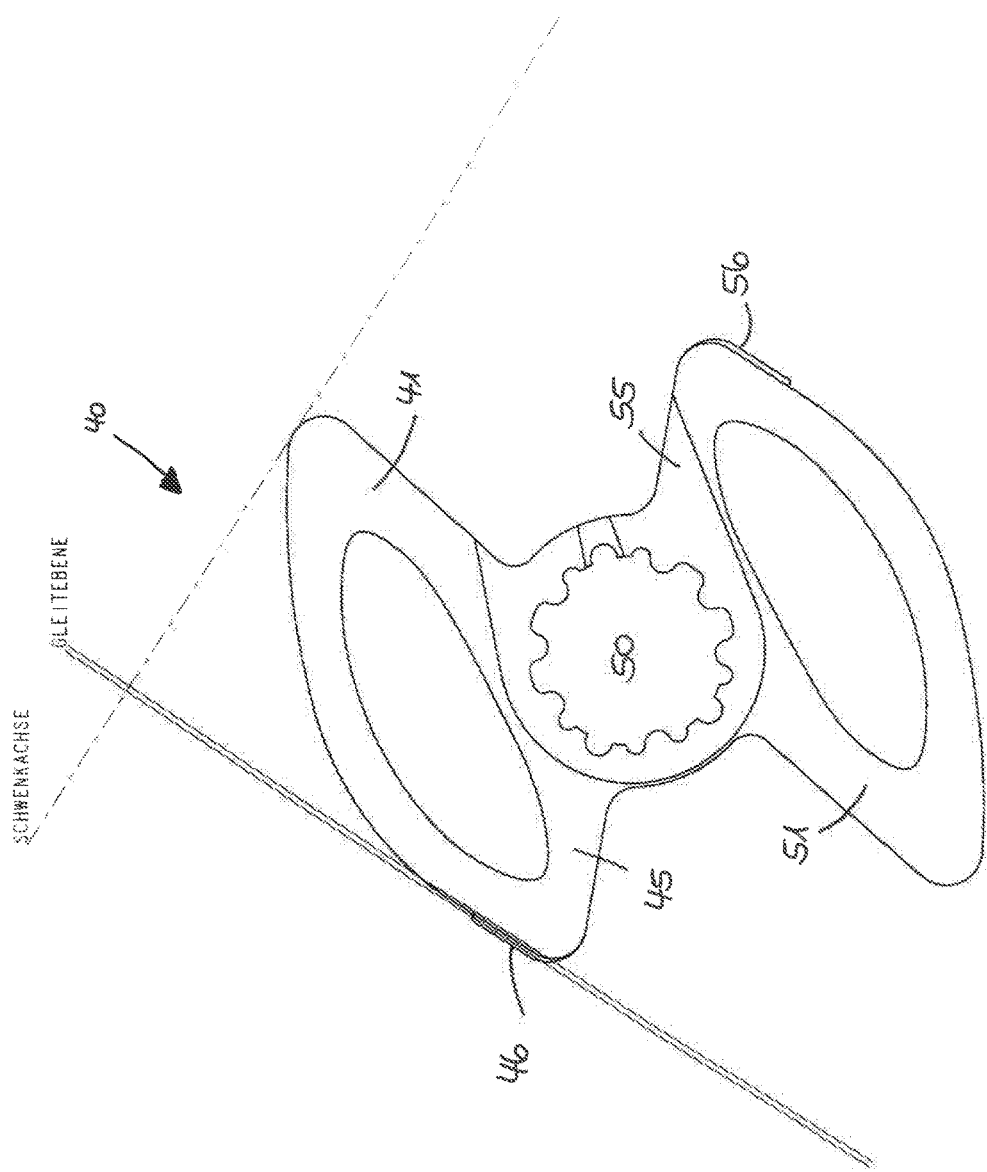

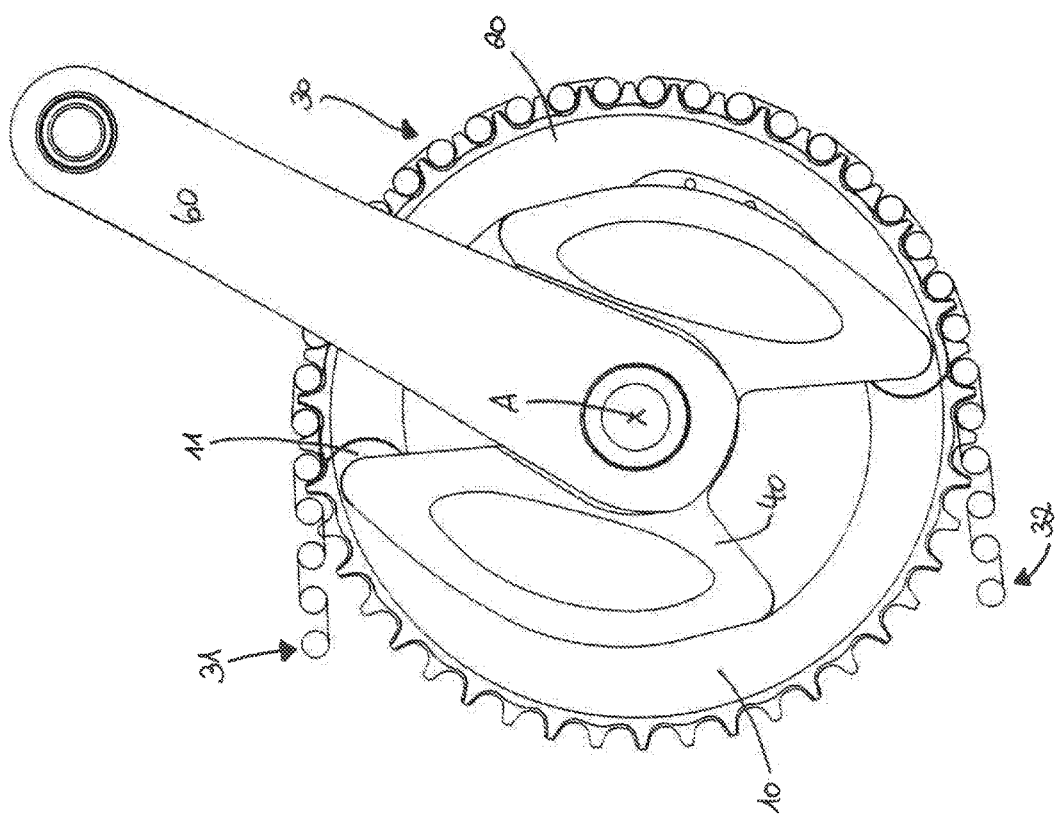

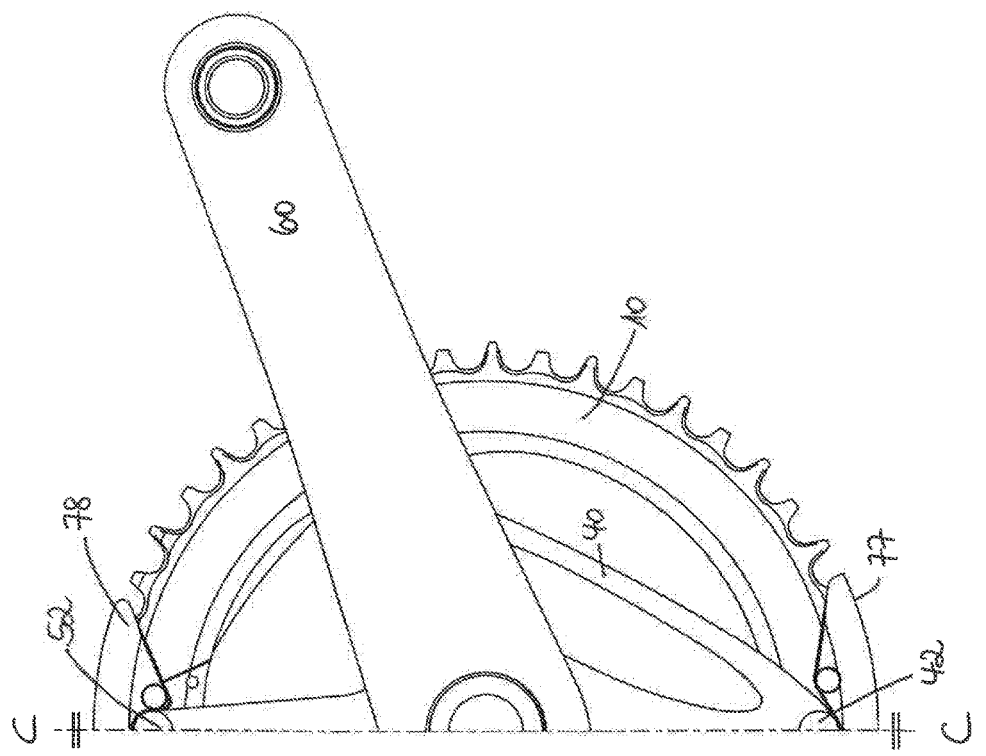
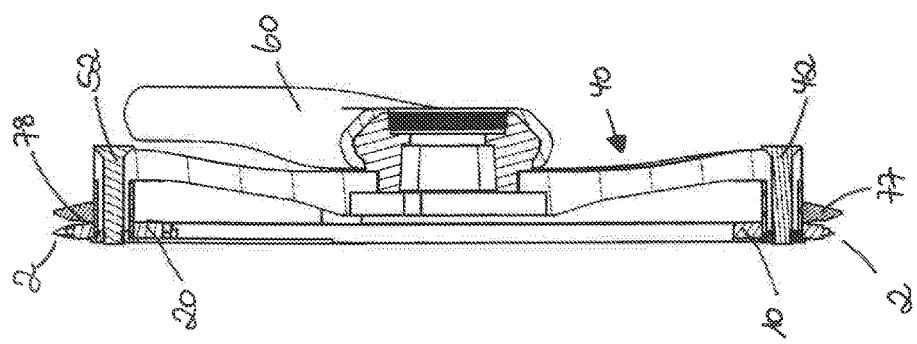
Fig. 9c

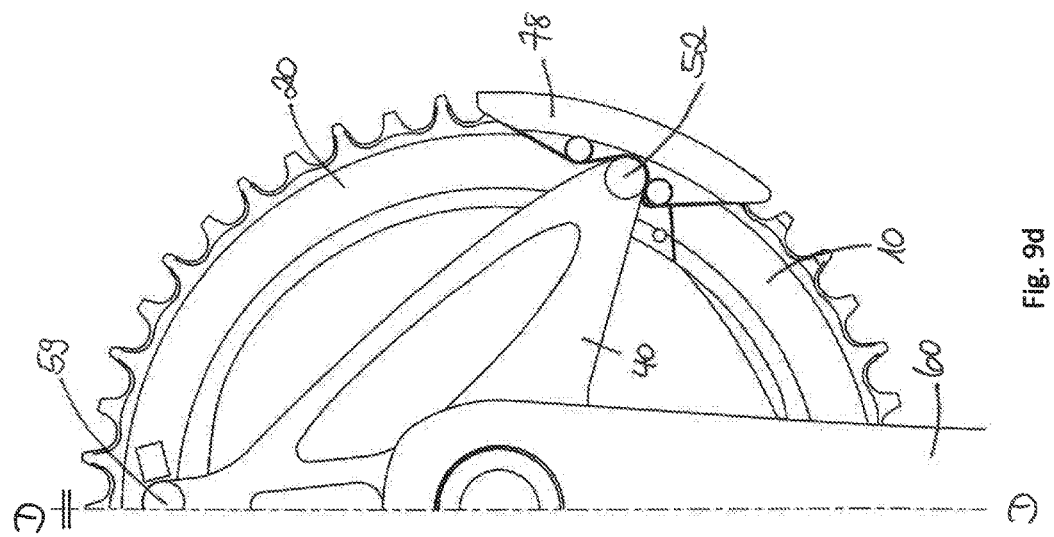
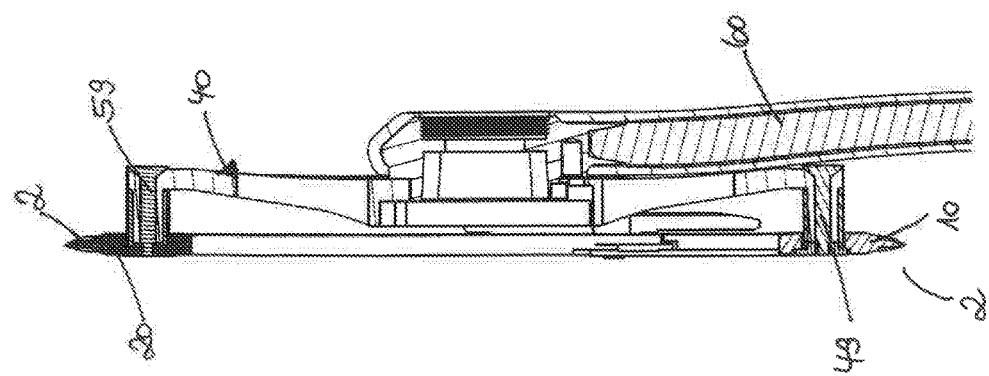
Fig. 9d

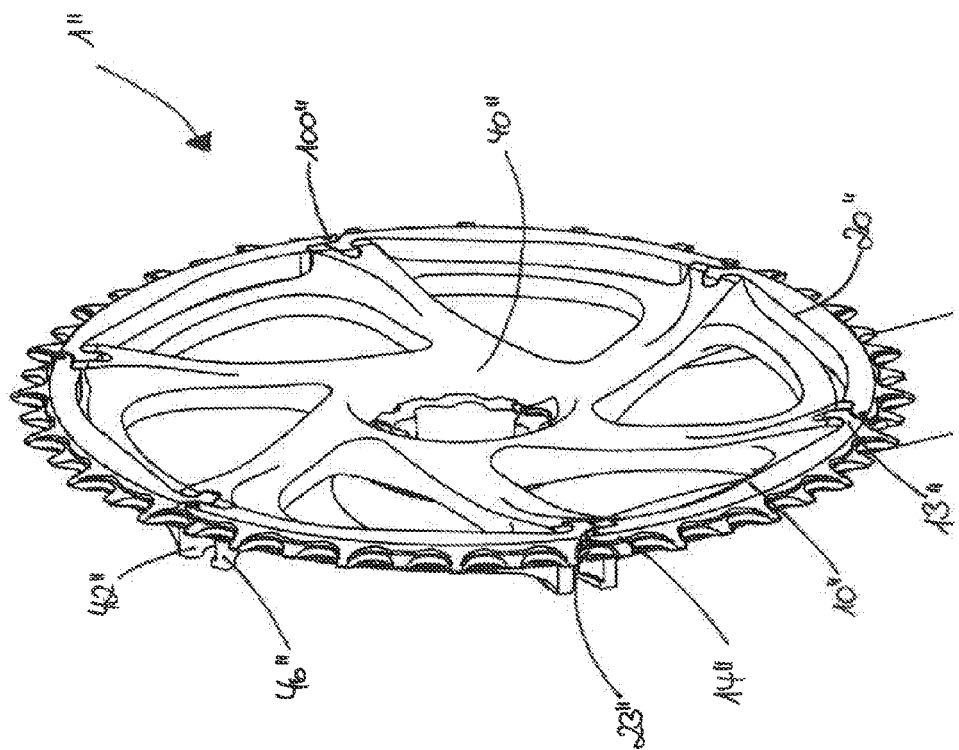

CHAINRING

This application claims priority to, and/or the benefit of, German patent application DE 10 2015 016 263.2, filed on Dec. 15, 2015, the contents of which are herein referenced in their entirety.

FIELD OF THE INVENTION

The invention relates to a chainring with a first chainring segment and a second chainring segment for a chainring arrangement of a bicycle. In addition, the invention relates to a crankset and to a drive arrangement for a bicycle with a chainring arrangement.

BACKGROUND

Attempts are often made to avoid problematic shifting under load at the front chainring. Instead of this shifting under load coverage of as much as possible of the gear spectrum is achieved by means of a correspondingly developed rear multiple sprocket arrangement. A front single chainring together with a high number of eleven or twelve rear sprockets can achieves good coverage. On account of the high number of axially adjacent sprockets on the rear wheel, the width of the multiple sprocket arrangement is certainly enlarged. The chain that meshes with the chainring is also axially secured on the front chainring by means of the axially secured single chainring. On the rear wheel, however, the chain has to overcome a section of several centimeters when shifting from the smallest to the largest sprocket in the axial direction. This increasingly results in the chain running at an angle (also called skew) which has a negative effect on the efficiency, the wear susceptibility, and the noise development of the drive.

Possible solutions which deal with this problem are known from the prior art. Axially displaceable single chainrings which are to adapt to the chain line are thus provided. Different approaches are disclosed in U.S. Pat. No. 6,173,982 B1, US 2013/008282 A1 and DE 10 2015 104 670 A1. The single front chainring is to be displaced on account of the axial forces occurring when the chain is in skew and aligned corresponding to the position of the chain on the rear sprocket arrangement. For this reason, the chainring is mounted so as to be axially displaceable, for example by means of slide bearings or articulations. The problem here is that shifting occurs on the rear multiple sprocket arrangement when there is pressure on the pedals. The chainring meshes with the chain and is under load when there is pressure on the pedals, i.e. the chain is tensioned and presses the chainring against the bearing arrangement. Consequently, the chainring moves axially under the full load of the tensioned drive chain, which frequently leads to the chainring canting at the bearing arrangements and making movement difficult. The axial force acting from the chain onto the chainring is relatively small and is often insufficient to ensure displacement of the chainring.

The prior art also discloses multiple chainring arrangements which include at least one segmented chainring. The chainring segments are not connected together along their ends in the circumferential direction and are consequently movable relatively freely in relation to one another and independently of one another. The segments can be tilted or axially displaced into the chain line by means of a shifting aid, e.g. a cable pull, and thus moved into engagement with the chain. When changing the gear ratio at the front chainring, the chain does therefore not migrate between fixed adjacent chainrings, but, conversely, the chainrings are displaced into the fixed chain line. The goal of said arrangement is to facilitate shifting between the adjacent front chainrings without at the same time changing the chain line. Said approach certainly does not overcome the disadvantages of chain skew which occurs precisely in the case of arrangements with one single front chainring and an increased number of rear sprockets.

SUMMARY AND DESCRIPTION

An embodiment provides a chainring for a chainring arrangement for a bicycle, the chainring comprising: a first chainring segment comprising a first plurality of teeth along a first outer circumference and configured to rotate about a rotational axis; and a second chainring segment comprising a second plurality of teeth along a second outer circumference and configured to be rotatable about the rotational axis. The first chainring segment further comprises a first front end and a first rear end in a circumferential direction, the second chainring segment further comprises a second front end and a second rear end in the circumferential direction, and the first front end of the first chainring segment and the second rear end of the second chainring segment are configured to be movably connected such that the first chainring segment and the second chainring segment are displaceable relative to one another in an axial direction of the rotational axis. The first plurality of teeth and the second plurality of teeth form a third plurality of teeth along the outer circumference of the first and second chain ring segments for engaging in a drive chain.

Another embodiment provides a crankset for a bicycle including a chainring arrangement, the chainring arrangement comprising: a first chainring segment comprising a first plurality of teeth along a first outer circumference and configured to rotate about a rotational axis; and a second chainring segment comprising a second plurality of teeth along a second outer circumference and configured to be rotatable about the rotational axis. The first chainring segment further comprises a first front end and a first rear end in a circumferential direction, the second chainring segment further comprises a second front end and a second rear end in the circumferential direction, and the first front end of the first chainring segment and the second rear end of the second chainring segment are configured to be movably connected such that the first chainring segment and the second chainring segment are displaceable relative to one another in an axial direction of the rotational axis. The crankset further comprises a carrier configured to be rotatably fastened about the rotational axis and for connecting the chainring to a crank in a torque-transmitting manner, wherein the chainring is mounted on the carrier so as to be movable in order to enable a movement of the chainring relative to the carrier in the axial direction of the rotational axis.

Yet another embodiment provides a drive arrangement for a bicycle, the drive arrangement comprising: a first chainring segment comprising a first plurality of teeth along a first outer circumference and configured to rotate about a rotational axis; and a second chainring segment comprising a second plurality of teeth along a second outer circumference and configured to be rotatable about the rotational axis. The first chainring segment further comprises a first front end and a first rear end in a circumferential direction, the second chainring segment further comprises a second front end and a second rear end in the circumferential direction, and the first front end of the first chainring segment and the second rear end of the second chainring segment are configured to be movably connected such that the first chainring segment and the second chainring segment are displaceable relative to one another in an axial direction of the rotational axis. This embodiment further provides a multiple sprocket arrangement for a rear wheel hub; a drive chain for engaging a chainring of the chainring arrangement and a sprocket of the multiple sprocket arrangement and for transmitting a driving force from the chainring arrangement to the multiple sprocket arrangement; and a rear derailleur for positioning the drive chain on one of the sprockets of the multiple sprocket arrangement. The chainring of the chainring arrangement is configured to align with the position of the drive chain on the multiple sprocket arrangement along the rotational axis.

BRIEF DESCRIPTION OF THE DRAWINGS

FIG. 4a is a perspective view of the chainring in engagement with a drive chain with segments aligned with respect to one another;

FIG. 4b is a perspective view of the chainring in engagement with a drive chain with segments displaced with respect to one another;

FIG. 5a is an exterior view of the carrier of the chainring arrangement;

FIG. 5b is a perspective interior view of the carrier from FIG. 5a;

FIG. 6b is an interior view of the chainring arrangement from FIG. 6a;

FIG. 7 shows the chainring arrangement with mounted crank in engagement with the drive chain;

FIG. 9b is an interior view of the chainring arrangement from FIG. 9a;

FIG. 9c is a sectional view of the chainring arrangement from FIG. 9a along the line C-C;

FIG. 9d is a sectional view of the chainring arrangement from FIG. 9a along the line D-D;

FIG. 10b is a perspective exterior view of the chainring arrangement from FIG. 10a; and FIG. 10c is a perspective interior view of the chainring arrangement from FIG. 10b.

DETAILED DESCRIPTION OF THE DRAWINGS

Figure 1:
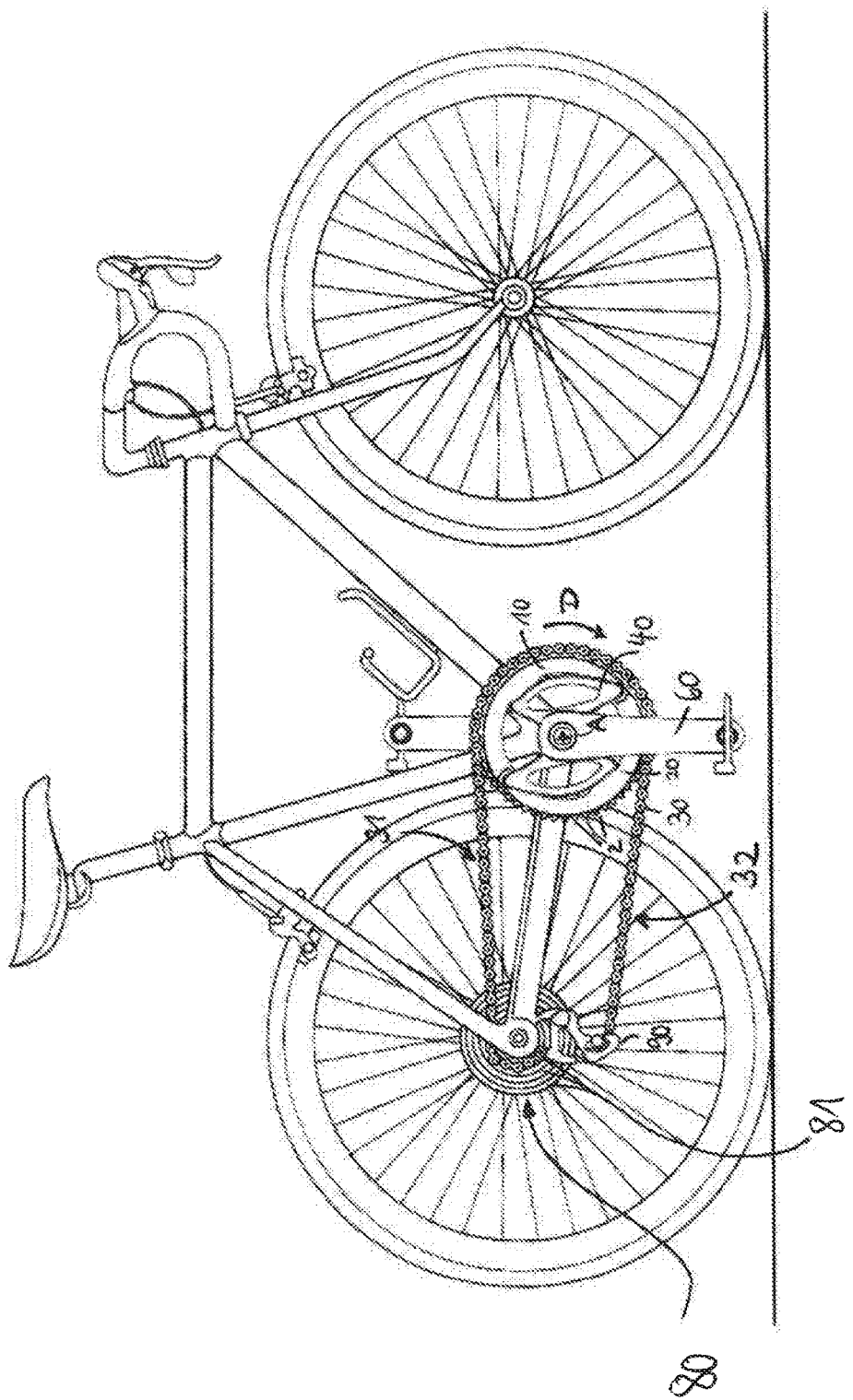
FIG. 1 shows a bicycle with a drive arrangement.

The chainring for a chainring arrangement of a bicycle comprises a first chainring segment and a second chainring segment. The first chainring segment and the second chainring segment can be arranged so as to be rotatable about a rotational axis A. The first chainring segment comprises a first front end and a first rear end in a circumferential direction U. The second chainring segment comprises a second front end and a second rear end in a circumferential direction U. The first front end of the first chainring segment and the second rear end of the second chainring segment are movably connected such that the first chainring segment and the second chainring segment are able to move relatively to one another in the direction of the rotational axis. The first chainring segment and the second chainring segment comprise a plurality of teeth along their outer circumferences for engaging in a drive chain.

The connection of adjacent segments in the circumferential direction U results in the axial movement of one segment being delimited in relation to its adjacent segment. Individual segments are not able to be moved in a non-delimited manner or independently of the adjacent segment.

The segmenting of the chainring allows for axial displacement of the chainring segment that is not under load or is only under a small load. The chainring segments are primarily aligned with the chain line when running into the chain. Precisely when the first teeth of the segment are moved into engagement with the chain, and even before they are under load, that is to say before the chain roller interacts with the load edge of the tooth, the chainring segment is displaced axially. When the first teeth of the segment are moved into engagement with the chain, that is to say run into the chain, initially only the axial force F of the chain skew acts on the teeth, not however the tensile force Z. The segments are displaced most easily in said region. As soon as the segment is under load, it is displaced less smoothly.

The advantage in this case is that a segment of the segmented chainring is displaced more easily in the axial direction because, in contrast to an integral chainring, not the entire chainring is under the load of the chain. As described above, a segment is not under load until a roller of the drive chain interacts with the load flank of a tooth.

For better understanding, the chainring that is rotatably mounted on the bicycle can be divided into two approximately equal regions or halves; a front region, which is constantly under load when pressure is applied to the pedals, points forward in the direction of travel of the bicycle and engages the chain, and a rear region which is load-free and does not engage the chain. For reasons of simplification, however, halves will be talked about below even if the same do not make up precisely one half of the chainring.

The chainring with its two segments rotates about the rotational axis A such that, in an alternating manner, the first and the second chainring segments enter into the region under load and leave it again.

The segment is initially load-free precisely when a chainring segment runs into the drive chain, such that a relatively small axial force from the skewed chain onto the chainring segment is sufficient to move the same in the axial direction.

The first and the second chainring segments are consequently moved gradually in an alternating manner in a direction along the rotational axis A in dependence on the skew of the chain. The movement occurs primarily when the segments engage in the drive chain, that is to say at each half crank rotation. The axial movement of the chainring segment is delimited by its adjacent segment, to which it is movably connected.

In an embodiment, the first chainring segment comprises a projection on its first front end, and the second chainring segment comprises a recess on its second rear end. The first and second chainring segments are connectable together by the projection engaging in the recess.

In an embodiment, such a connection is developed similarly to a tongue and groove connection, it being possible for the segments to move relatively to each other in the axial direction.

In principle, any type of connection which is suitable for the purpose of connecting the first and the second chainring segments at their ends facing one another in the circumferential direction U (transition region) so as to be movable relatively to one another in the direction of the rotational axis A is conceivable. The meshing of elements, such as, e.g. a projection and a recess or a tongue and a groove is useful. The projection or the recess, in this case, can be arranged on the first or on the second segment.

The ends of a chainring segment can be the same or different in form. In an embodiment, the front end of a segment comprises a convex form and the rear end comprises a concave form. However, it would also be conceivable to realize the ends of the segments in a linear manner.

When viewed in the direction of the rotational axis A, a width of the projection is preferably smaller than a width of the recess such that a relative movement between the first chainring segment and the second chainring segment is possible in the axial direction of the rotational axis A.

This means that the width of the projection measures less in an axial direction A than the width of the recess and consequently creates the desired moving space between the segments.

In an embodiment, the difference between the width of the projection and the width of the recess in the axial direction A is approximately 0.7 millimeters. The axial clearance created allows the first chainring segment to be moved by a maximum of 0.7 millimeters in the axial direction relative to the second chainring segment per crank rotation.

The maximum movement of the segments relative to one another or in relation to the adjacent chainring segment is defined by the clearance in the connection. The greater the clearance, the greater the relative movement per crank rotation. The relative movement of the segments leads to gradual displacement of the entire chainring in the axial direction A.

The axial clearance or the moving space between the segments is, on the one hand, to be dimensioned sufficiently large such that the segments are moved far enough in the axial direction A per crank rotation. On the other hand, the clearance must not be too large because otherwise the drive chain can come off the chainring in an unwanted manner.

The chainring segments and consequently the entire chainring are moved in the direction of the rotational axis A by an axial force F. The axial force F is exerted from the drive chain onto the chainring when a chain link of the drive chain engages with a tooth. The axial force F of the chain is transmitted to the segment when the chain plate interacts with the chamfer of the tooth. The smaller the skew of the chain, the further the tooth plunges into the chain before there is contact between the chain plate and the chamfer of the tooth. Consequently, the axial movement of the segments also reduces as the chain skew diminishes.

In an ideal situation, the front chainring and the chosen rear sprocket lie in one plane—the ideal chain line with no lateral load on the chain. Deviations from said ideal chain line are designated as skew. The greater the skew of the drive chain or the greater the angle of the chain to the chainring, the greater the axial movement of the chainring segment carried out on account of the skew. Depending on the direction of the skew, an axial force F will act inwards or outwards and move the chainring correspondingly along the rotational axis A. The chainring is moved along the rotational axis A until there is no load or hardly any load as a result of the skew, that is to say an almost ideal chain line is produced.

In practice, however, the axial space for the chainring can be smaller than the width of the multiple sprocket arrangement such that the ideal state can only be realized in the middle gear range. Nevertheless, the positive effects of reduced skew can really be noticed precisely in the extreme positions on the largest and smallest sprocket.

It is advantageous, in this case, that the chainring is aligned automatically on account of the axial force F of the chain. No further force needs to be introduced into the system of chainring and chain. Control from outside, as occurs, for example, when shifting by means of actuating a cable, is not necessary. Depending on the skew of the chain, the chainring is aligned as it were automatically and produces an at least approximately ideal chain line. Additional means for displacing the segments, as are disclosed in the prior art, are not required.

In an embodiment, the plurality of teeth comprises first teeth and second teeth which alternate, the first teeth being different from the second teeth.

In an embodiment, the first and second teeth differ in their form and/or their dimension. The first and second teeth can also differ in their extension in the axial direction and/or in the radial direction and/or in the circumferential direction. In addition, the first and/or the second teeth can be realized asymmetrically in the axial direction and/or in the circumferential direction. The form of the teeth can differ with reference to their tooth tip, flank angle and chamfer. The prior art discloses diverse embodiments which have a favourable effect on the guiding characteristics of the drive chain. For example, the first teeth are realized thicker, wider and/or longer than the second teeth.

In an embodiment, all the teeth of the plurality of teeth do not necessarily have to be realized as alternating first and second teeth. A sequence of at least three alternating first and second teeth (thick, thin, thick) is also conceivable.

A drive chain, which is moved into engagement with the teeth, can also be realized corresponding to the diversely realized first and second teeth. The inside and outside plates of the chain are matched to the first and second teeth. Said matching requires the first teeth always to engage in a chain link formed by outside plates and the second teeth always to engage in a chain link formed by inside plates. This only occurs when the chainring comprises an even number of teeth. The overall number of teeth is produced from the added number of teeth of the first and of the second segments. Different first and second teeth together with a correspondingly matched drive chain improve the connection between teeth and drive chain and reduce the risk of a chain jumping from the chainring if there is a shock. Diversely realized teeth that alternate are used, above all, with drives with only one single chainring. The advantages of improved meshing are particularly realized here.

In an embodiment, the teeth which are arranged in the region of the ends of the chainring segments (in the transition region), are realized smaller or shorter than the remaining teeth. As an alternative to this, a transition region between the first and the second segments is even free of first and second teeth. A tooth-free transition region or a transition region with smaller teeth has a positive effect on the transmission of the axial force F from the chain to the segments and consequently on the mobility of the entire chainring. The chain is provided with more space for entering the transition region at an angle, which results in increased axial force F at the tooth.

In an embodiment, the first and the second chainring segments are realized in an identical manner. Identical realization facilitates production of the segments and saves costs and time.

Identical realization of the chainring segments with alternating first and second teeth is possible if each segment comprises an even number of teeth. Where there is an even number of teeth per segment, in each case a first tooth is arranged on the front end and a second tooth on the rear end of a segment.

Segments with alternating first and second teeth and an uneven number of teeth comprise in each case identical teeth on their front and rear ends. A segment with, for example, 23 alternating first and second teeth, which has at its front end and rear end in each case a first thick tooth, demands an adjacent segment which has a thin, that is to say second, tooth following the thick tooth. Consequently, the segments, as concerns the sequence of the first and second teeth, are not identical.

It would be conceivable to develop the chainring segments differently also beyond the tooth sequence. The segments could be realized with different sizes in the circumferential direction U. The pedal forces are transmitted to the chainring depending on the angle of the crank. No force is transmitted at the dead points. The segment sizes and consequently the transitions between adjacent segments could be matched to said changing force ratios.

In an embodiment the first and/or the second chainring segments each comprise a support element. The support element is arranged axially offset from the front end of the segment. The support element is arranged and realized such that it interacts with an outer surface of the drive chain that faces it.

Depending on which side of the segment the support element is arranged, the plates of said side of the drive chain engage between the teeth and the support element. The outside surface of a drive chain situated in skew is supported on the support element such that the axial force F from the drive chain is transmitted to the teeth and additionally to the support element. Depending on the direction of the skew, the axial force F acts both on the tooth and on the support element in said same direction and supports the axial movement of the segment. If the space allows, support elements on both sides of the segments would be particularly advantageous, as the axial movement would be supported irrespective of the direction of the skew. In the majority of cases, however, the space between the chainring and the frame is so limited that it is only possible to mount the support element on the outer surface of the segment (that is to say to the right of the chainring in the direction of travel).

In an embodiment, the first rear end of the first chainring segment and the second front end of the second chainring segment are movably connected.

Consequently, the first and second segments are connected together in each case at their front and rear ends and form a closed chainring from two segments. In the case of embodiments with more than two segments, the front and rear ends of a segment engage in each case in different adjacent segments.

The operating principle of a chainring with movably connected segments exists irrespective of the number of chain segments. Along with two segments, several interconnected chainring segments of the same or different size are conceivable. Division into six identical segments is particularly preferred. Embodiments with many segments result in many small steps being completed in the axial direction per crank rotation. In each case, as a segment runs in, such a step is completed. In the event of six segments, this produces six small steps per crank rotation, the step size of which in the axial direction is defined by the size of the axial clearance between adjacent segments.

The development of the chainring is not restricted in principle to circular embodiments. Oval or elliptical chainrings consisting of two or more segments would also be conceivable. Such non-round chainrings counter the fact that due to the dead points, the cyclist does not apply the same force to the pedal in each crank position.

Additionally there may be a crankset or a chainring arrangement for a crankset of a bicycle. The chainring arrangement comprises a chainring and a carrier. The carrier is suitable for being fastened so as to be rotatable about the rotational axis A. The carrier is further realized for connecting the chainring to the crank in a torque-transmitting manner, the chainring being mounted on the carrier so as to be movable in order to enable a movement of the chainring relative to the carrier in the direction of the rotational axis A.

The carrier, in this case, can either be realized integrally with the crank or can be connected as a separate part to the crank in a torque-transmitting manner.

If the chainring arrangement is mounted on the crank, the crank is rotated together with the carrier and the chainring about the rotational axis A, which corresponds to the axis of the pedal bearing. The carrier is mounted so as to be rotatable about the axis A, but is otherwise fixed in all other directions. In contrast, the chainring is mounted so as to be both rotatable about the rotational axis A and movable along said axis A. The chainring engages the carrier in a torque-transmitting manner. Consequently, the chainring is rotated together with the carrier and can be moved relative to the carrier in the axial direction. The axial movement of the segments or of the entire chainring in relation to the carrier is essentially a linear movement along the rotational axis A.

The movable bearing arrangement of the chainring on the carrier can be configured in various ways. Both the number of bearing points and the type of bearing arrangement can vary and is within the discretion of the expert. Two or more bearings are provided per segment for a sturdy bearing arrangement. Generally speaking, the bearing arrangement is a connection between the chainring segment and the carrier with at least one degree of freedom in the direction of the rotational axis A. For this reason, the bearing arrangement usually comprises bearing elements on the chainring segment and counter bearings on the carrier. The bearing elements on the segment interact with the counter bearings on the carrier such that the segments are able to move in the axial direction in relation to the carrier.

In an embodiment, the first and the second chainring segments each comprise a first bearing element. In a particularly advantageous manner, the arrangement of the first bearing element is in the region of the front end in the circumferential direction U, in particular in the front region of the front end of the chainring segment. In an embodiment, the first bearing element is realized as an opening, a guide surface or a stud.

In another embodiment, the first and the second chainring segments each comprise a second bearing element. In a particularly advantageous manner, the arrangement of the second bearing element is in a region in the circumferential direction U between the rear end and a central portion of the chainring segment. The second bearing element is preferably realized as an opening, a guide surface or a stud.

In yet another embodiment, a first and/or second bearing element realized as a guide surface is arranged on an inner circumferential surface of the chainring segment.

In yet another embodiment, the carrier comprises a first arm and a third arm, each with a first counter bearing. The first counter bearing may be realized as an opening, a guide surface or a stud.

In yet another embodiment, the carrier comprises a second arm and a fourth arm, each with a second counter bearing. The second counter bearing may also be realized as an opening, a guide surface or a stud.

In an embodiment, the first bearing element on the chainring segment is realized as an opening and interacts with the first counter bearing on the carrier which is realized as a stud. The stud can also be realized the other way around on the chainring segment and the opening on the carrier.

In order to allow the movement of the chainring segment, and consequently of the chainring, relatively to the carrier in the direction of the rotational axis A, a diameter of the stud is smaller than a diameter of the opening. The clearance generated by the variously sized diameters between the stud and the opening enables a relative movement between the segment and the carrier.

In an embodiment, the opening comprises an inclination. The inclination allows the chainring segment to tilt relatively to the carrier.

The tilting movement of the segment relatively to the carrier supports and accelerates the axial movement of the chainring along the rotational axis A and consequently the achieving of the ideal chain line. The skew of the drive chain leads to both tilting the segment about the stud of the carrier and to displacing it axially along the stud.

In an embodiment, the second bearing element on the chainring segment is realized as a guide surface and interacts with the second counter bearing on the carrier which is also realized as a guide surface. In this case, the guide surface of the chainring segment is moved along the guide surface of the carrier in the direction of the rotational axis A.

For a sturdy bearing arrangement, a chainring segment may comprise in each case two bearing elements which interact in each case with two counter bearings on the carrier. In this case, this can be two identically realized bearing elements on the segment, such as, for example, two openings which interact with two counter bearings on the carrier, e.g. two studs. However, the two bearing elements and their counter bearings can also be realized differently.

In an embodiment, the chainring arrangement comprises one single chainring. In the case of a chainring arrangement with simply one chainring (single chainring), the rear multiple sprocket arrangement has an increased number of sprockets. The high number of sprockets allows that the cyclist has sufficient gears to choose from. At the same time, however, the high number of sprockets also results in a widening of the multiple sprocket arrangement and in a resultant skew of the chain. The chainring is hugely significant for balancing out the skew precisely in the case of such arrangements.

The invention further relates to a drive arrangement for a bicycle. The drive arrangement comprises a chainring arrangement, a multiple sprocket arrangement for a rear wheel hub, a drive chain and a rear derailleur. The drive chain is realized for engaging in the chainring of the chainring arrangement and in a sprocket of the multiple sprocket arrangement. The drive chain is further realized for transmitting a driving force Z from the chainring arrangement to the multiple sprocket arrangement. The rear derailleur is used for positioning the drive chain on one of the sprockets of the multiple sprocket arrangement, wherein the chainring of the chainring arrangement is aligned with the position of the drive chain on the multiple sprocket arrangement along the rotational axis A.

The position of the chain on the rear multiple sprocket arrangement depends on the choice of gear ratio or gear. Depending on which sprocket of the multiple sprocket arrangement has been chosen, the position of the chain changes in the axial direction. The chain line and the chain skew are also changed in a corresponding manner. The front chain is aligned along its rotational axis A in dependence on the position of the chain on the rear multiple sprocket arrangement. The skew of the chain is consequently balanced out.

The alignment of the chainring preferably occurs automatically on account of the axial force F transmitted by the skew of the drive chain. The greater the skew of the chain, the greater the axial force F. Conversely, the axial force F acting from the chain onto the chainring diminishes together with the reducing skew. The chainring is moved along the rotational axis A until the skew of the drive chain has been balanced out and an approximately ideal chain line has been produced. Additional actuating elements for actively displacing the chainring or its segments are not required.

In principle, however, it is possible to align the chainring actively by means of such additional actuating devices. In this case, both mechanical, electric, electronic, electromechanical, pneumatic and also hydraulic actuating systems are conceivable. Said actuating devices can be controlled both manually and automatically. Within the framework of electronic bicycle gear change mechanisms, as are known, for example, from DE 10 2013 015 946 A1, it is possible to utilize electric motors for actuating devices for the active alignment of the chainring segments. The electric motors can be controlled both manually by the rider and automatically. Automated control could be based on sensors which detect the position of the chain on the cassette and send a corresponding signal to the control unit of the actuating means of the chainring, which aligns the same in a corresponding manner. It would also be conceivable for sensors to measure the skew of the chain or the axial force thereof and to be controlled correspondingly for the alignment. Such an active arrangement would certainly be more complicated and more expensive than the automatic alignment of the chainring, but would have the advantage that even very small deviations to the ideal chain line could be balanced out; in the event of automatic control even without the assistance of the cyclist.

In an embodiment, the multiple sprocket arrangement of the drive arrangement comprises at least eleven sprockets. In an embodiment, the multiple sprocket arrangement comprises twelve or thirteen sprockets.

However, multiple sprocket arrangements with a smaller, or even larger, number of variously sized sprockets are also conceivable. Depending on the area of application, the jumps between adjacent sprockets and consequently also between different gear ratios can be more or less large. Precisely in the case of drives for off-road bicycles, large spreads are important, i.e. a large difference between the number of teeth of the smallest and of the largest sprocket, in order to provide suitable gear ratios for traveling up and down hills.

In an embodiment, the multiple sprocket arrangement of the drive arrangement comprises at least one sprocket with alternating first and second teeth which are different from one another. The first and second teeth of the sprocket are different from one another in form and/or dimension.

In a similar manner to the first and second teeth of the chainring, the teeth can differ from one another in thickness, length, symmetry, chamfer etc. The teeth are realized such that, on the one hand, the guiding of the chain is improved, but on the other hand, smooth shifting between adjacent sprockets is possible.

FIG. 1 shows a bicycle with a drive arrangement. The directional specifications used below above/below and behind/in front relate to a bicycle or to the drive thereof when viewed in the direction of travel. The directional specifications inside/outside relate to the drive mounted on the bicycle frame and describe where the drive elements are arranged relative to the bicycle frame. Thus, for example, on the rear multiple sprocket arrangement 80 the smallest sprocket is arranged further outside than the adjacent larger sprocket and conversely the largest sprocket is arranged further inside than the adjacent smaller sprocket. The directional specification axial relates to the rotational axis A of the chainring and of the entire crankset. To drive the bicycle, the crank 60 is rotated clockwise about the rotational axis A in the direction of rotation D. The directional specification radial outwards and radially inwards describes the distance from the rotational axis A in the radial direction. The circumferential direction U relates to the circumference of the chainring.

The crank 60 is connected to the carrier 40 in a torque-transmitting manner. The individual front chainring comprises two segments 10, 20 and is movable relative to the carrier 40 along the rotational axis A (in the axial direction A). Radially outwards along their circumference, the segments 10, 20 comprise a plurality of teeth 2 which are in engagement with the drive chain 30. The front crankset is connected to the rear multiple sprocket arrangement 80 in a force-transmitting manner by means of the drive chain 30 such that the torque generated by the pedal force of a rider can be transmitted to the rear wheel of the bicycle. The drive chain 30 can be moved back and forth between adjacent sprockets 81 of the multiple sprocket arrangement 80 with the aid of the rear derailleur 90. The drive chain 30 provides a closed circle which transmits a tensile force between the front chainring and a rear sprocket 81 in the upper region. Said region of the chain 30 is under tension or load and is also called the load strand or the pulling strand 31. The bottom part of the chain 30, in contrast, is not under tension or load and is also called the slack strand 32.

Naturally, the drive is suitable not only for a road bicycle as shown but can also be used on a plurality of bicycle types, such as mountain bicycles, touring bicycles or E-bicycles.

Figure 2:
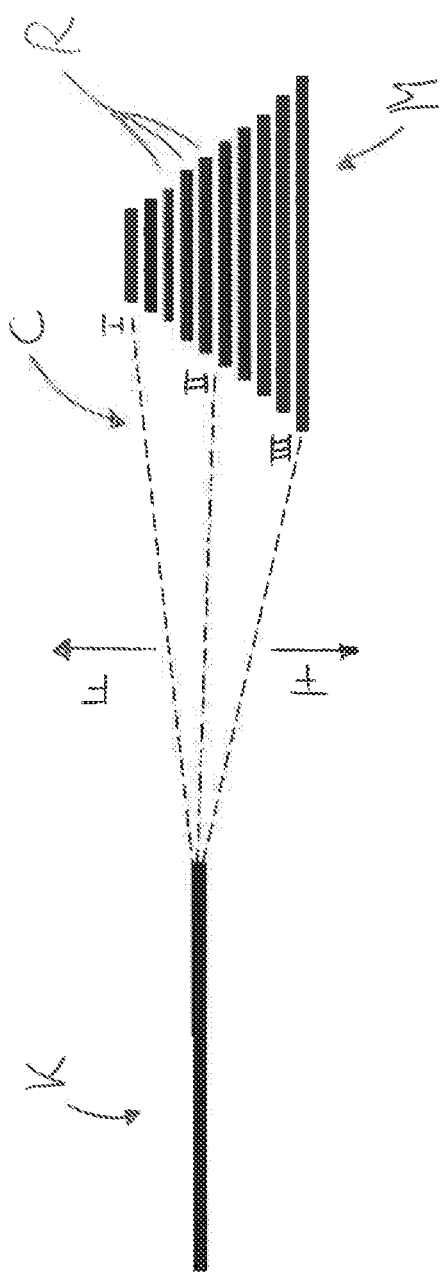
FIG. 2 is a schematic representation of a top view of a conventional bicycle drive and of the chain lines thereof in three different shift positions.

FIG. 2 is schematic representation of a top view of a conventional bicycle drive and of the chain lines thereof in three different shift positions. The representation serves for illustrating the object of the chainring arrangement. The conventional bicycle drive includes a front single chainring K which is fixed axially, a rear multiple sprocket arrangement M with 10 adjacent sprockets R of differing size and a chain C which connects the front chainring K to one of the rear sprockets R. The broken line provides the chain C or the chain line thereof. The chain C can be moved by means of a rear derailleur (not shown here) from one sprocket R to another and, depending on the requirement, positioned on the multiple sprocket arrangement M. The gear ratio of the drive changes corresponding to the position of the chain C on the multiple sprocket arrangement M. Associated therewith, the chain line consequently also changes.

As described in the introduction, the chain line provides the course of the chain between the front chainring and the rear sprocket. Ideally, the chainring and the sprocket are in alignment such that the chain line runs straight and optimum force transmission with the highest efficiency and the smallest amount of wear is possible. FIG. 2 shows the chain C in three different positions with the corresponding chain lines.

Position I shows the chain C in engagement with the smallest sprocket R. The chain C is situated in skew. The chain line runs outward at an angle from the chainring K. An axial force F acts outward from the chain C onto the chainring K.

Position II shows the chain C in engagement with a middle sprocket R. The chain line runs straight between the front chainring K and the rear sprocket R and is consequently ideal—desired chain line, no skew. No axial forces F are active.

Position III shows the chain C in engagement with the largest sprocket R. The chain C is situated in skew. The chain line runs inward at an angle from the chainring K. An axial force F acts inward from the chain C onto the chainring K.

If the chain is situated between the above-described positions, there is a correspondingly smaller skew with smaller axial forces.

As the chain is not moved axially on account of the front single chainring, the chain line depends solely on the position on the rear sprockets. The skew that is present in positions I and III has a disadvantageous effect on the efficiency of the force transmission between the chainring and the sprocket, on the wear and on the noise development and should be avoided. The greater the skew, the greater the corresponding disadvantages. The increasing number of sprockets and the widening of the multiple sprocket arrangement associated therewith results in the chain experiencing even greater skew in its extreme positions on the smallest and on the largest sprocket. The width of the multiple sprocket arrangement, however, is not just determined by the number of sprockets, but also by the thickness of the material of the sprockets. Thus, the sprockets for a bicycle operated with an electric motor are developed to be wider and sturdier, which also results in a large amount of skew in the extreme positions.

Figure 3:
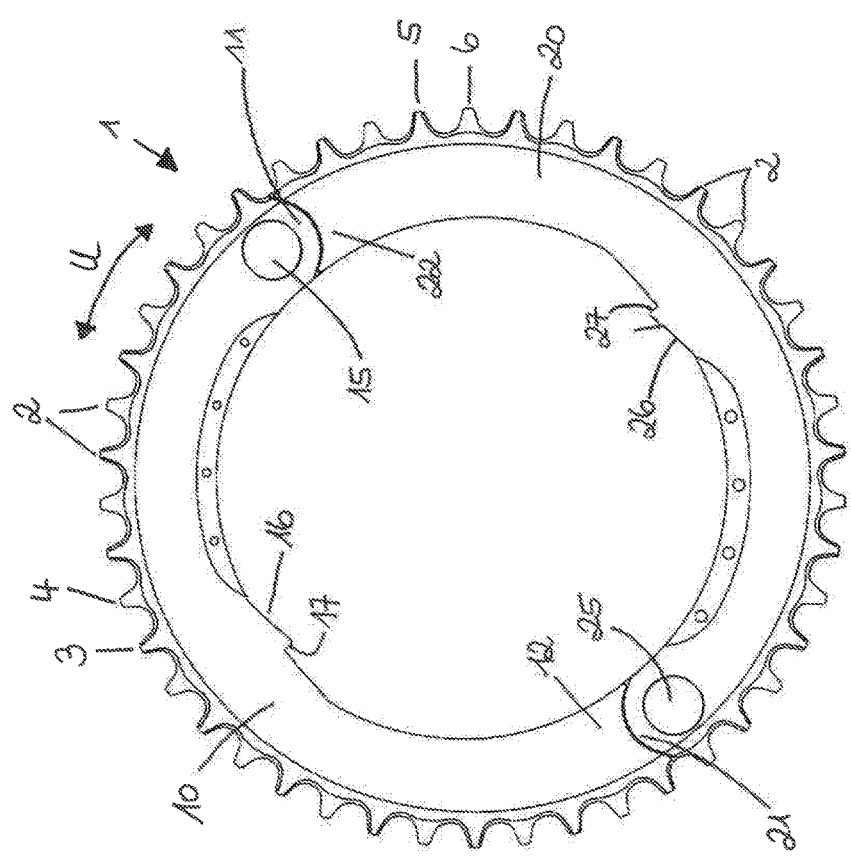
FIG. 3 is a side view of a chainring with chainring segments.

FIG. 3 shows the chainring 1 with a first chainring segment 10 and a second chainring segment 20. The segments 10, 20 are connected together at their ends so as to be movable. In this case, the first front end 11 of the first segment 10 is in engagement with the second rear end 22 of the second segment 20. In addition, the second front end 21 of the second segment 20 is also in engagement with the first rear end 12 of the first segment 10. The two segments 10, 20 consequently form a closed chainring 1.

The chainring segments 10, 20 comprise openings 15, 25 in each case on their front ends 11, 21. Guide surfaces 16, 26 and stops 17, 27, which act in the circumferential direction U, are realized on their inner circumferences. The openings 15, 25, the guide surfaces 16, 26 and the stops 17, 27 are realized in order to interact with a carrier 40 (not shown here) in a mounted state.

The chainring 1 or its segments 10, 20 comprise a plurality of teeth 2 which extend radially outward in the circumferential direction U along an outer circumference of the chainring 1. The plurality of teeth 2 consists of first teeth 3, 5 and second teeth 4, 6, the first teeth 3, 5 being realized thicker compared to the second teeth 4, 6. The first and second segments 10, 20 each comprise thick teeth 3, 5 and thin teeth 4, 6 in an alternating manner. The overall number of the plurality of teeth 2 is an even number of teeth, in the embodiment shown the chainring 1 comprises forty-six (46) teeth. Consequently, each segment 10, 20 has an uneven number of twenty-three (23) teeth, which results in the segments 10, 20 differing as regards the sequence of first teeth 3, 5 and second teeth 4, 6. The first segment 10 comprises on its front end 11 and on its rear end 12 in each case a first thick tooth 3 as an end tooth. In order to maintain an alternating sequence of thick and thin teeth, the second segment 20 comprises correspondingly on its front end 21 and its rear end 22 in each case a second thin tooth 6. Apart from the tooth sequence, the chainring segments 10, 20 do not differ from one another.

In the case of a chainring with, for example, forty-eight (48) teeth, there would be an even number of twenty-four (24) teeth in each case on both segments. This would result in both segments being identical also with regard to the tooth sequence. Both segments could comprise a first (thick) tooth on their front ends and a second (thin) tooth on their rear ends. The alternating sequence of first and second teeth in the circumferential direction would be provided. The simplified production of identically realized segments is an advantage because only one mould or one tool is required.

A chainring with more than two segments would also be conceivable. The design of such a chainring would, however, correspond extensively to the one above. The segments could also be realized in an identical manner and would be connected in each case to adjacent segments at their ends.

FIGS. 4*a* and 4*b* show perspective views of the chainring together with, in each case, an enlarged view of a detail with the segments in different positions—once aligned relative to one another and once displaced relative to one another. They illustrate the mobility of the chainring segments 10, 20 relative to one another. As the chainring 1 is preferably moved by an axial force F of the chain 30 in the axial direction, part of the chain 30 is shown in engagement with the plurality of teeth in 2. The upper part of the chain 30 is not shown to improve the representation of the segments.

FIG. 4*a* shows the chainring 1, the two chainring segments 10, 20 being aligned in a line relative to one another. The enlarged view of a detail shows the front end 11 of the first segment 10 which is movably connected to the rear end 22 of the second segment 20. In this case, the projection 13 of the first segment 10 engages in an indentation 24 of the second segment 20 and is positioned centrally with respect to the same. The segments 10, 20 remain in said position aligned relative to one another for as long as the desired chain line is retained, that is to say that no force or only a very slight axial force F acts from the chain 30 on the plurality of teeth 2 of the segments 10, 20.

As soon as the chain 30 is situated in skew on account of a gear change on the rear multiple sprocket arrangement, it leaves the ideal chain line. In skew, an axial force F from the chain 30 acts on the plurality of teeth 2 of the chainring 1 or of the chainring segments 10, 20. In the case shown in FIG. 4*b*, the first segment 10 is displaced inward toward the bicycle frame relative to the second segment 20. This suggests that the chain 30 is situated in inward skew, that is to say has been shifted from a smaller sprocket to a larger one. On account of this, an axial force F is transmitted from the chain 30 to the segments 10, 20, which also moves them inward.

Said movement is realized in steps, the segments 10, 20 being displaced relative to one another in dependence on the crank rotation. Each movement step is defined and delimited in relation to the recess 24 by means of the dimensions of the projection 13. The greater the axial clearance between the projection 13 and the recess 24, the greater the relative movement of the segments per crank rotation.

FIG. 4*b* additionally shows the openings 15, 25 in the segments 10, 20. On their outside surfaces, the openings 15, 25 comprise inclinations 18, 28 which allow the segments 10, 20 to be tilted in relation to the carrier 40 in the mounted state. Above all, the inclinations 18, shown in the enlarged views of a detail, on the outside surface of the openings, said outside surface being located radially on the outside, are significant to the tilting. The corresponding tilt or pivot axis is marked in FIG. 5*a* and shows the axis about which the first segment 10 tilts in relation to the carrier 40. See also FIG. 8 for the tilt movement.

Figure 5B:
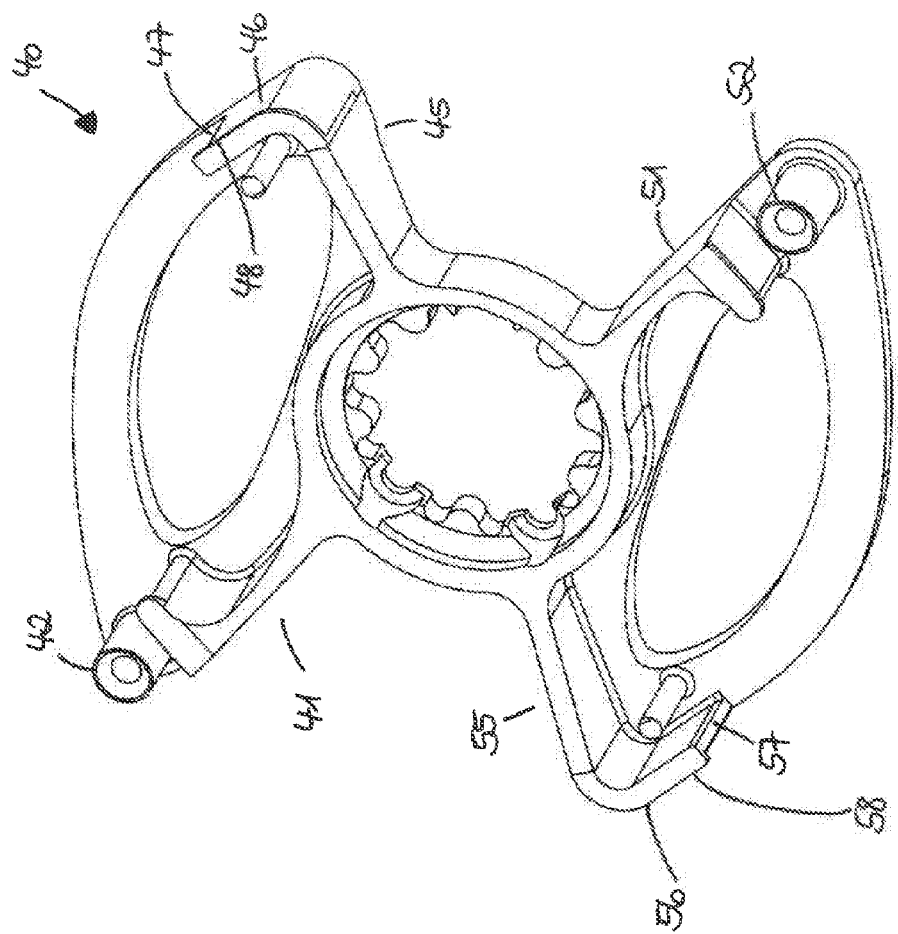

FIGS. 5*a* and 5*b* show an exterior and interior view of the carrier 40. The carrier 40 comprises a first arm 41 with a stud 42 and a second arm 45 with a guide surface 46. In addition, the carrier 40 comprises a third arm 51 with a stud 52 and a fourth arm 55 with a guide surface 56. The carrier 40 has a receiving means 50 for a crank, which allows it to connect the crank to the carrier 40 in a torque-transmitting manner. In the example shown, in each case the first and second arms 41, 45 and third and fourth arms 51, 55 are connected together. Said connection between the arms contributes to the rigidity and consequently to the stability of the carrier 40, but is not absolutely necessary.

FIG. 5*b* shows the studs 42, 52, which are designed to engage in the openings of the segments (not shown here) in the mounted state. The axial stops 48, 58 and the guide surfaces 46, 56 can be seen well in said view. In the mounted state, the segments slide with their guide surfaces along the guide surfaces 46, 56 (see slide plane in FIG. 5*a*). The axial stops 48, 58 delimit the axial movement and prevent the segments falling from the carrier 40.

Figure 6A:
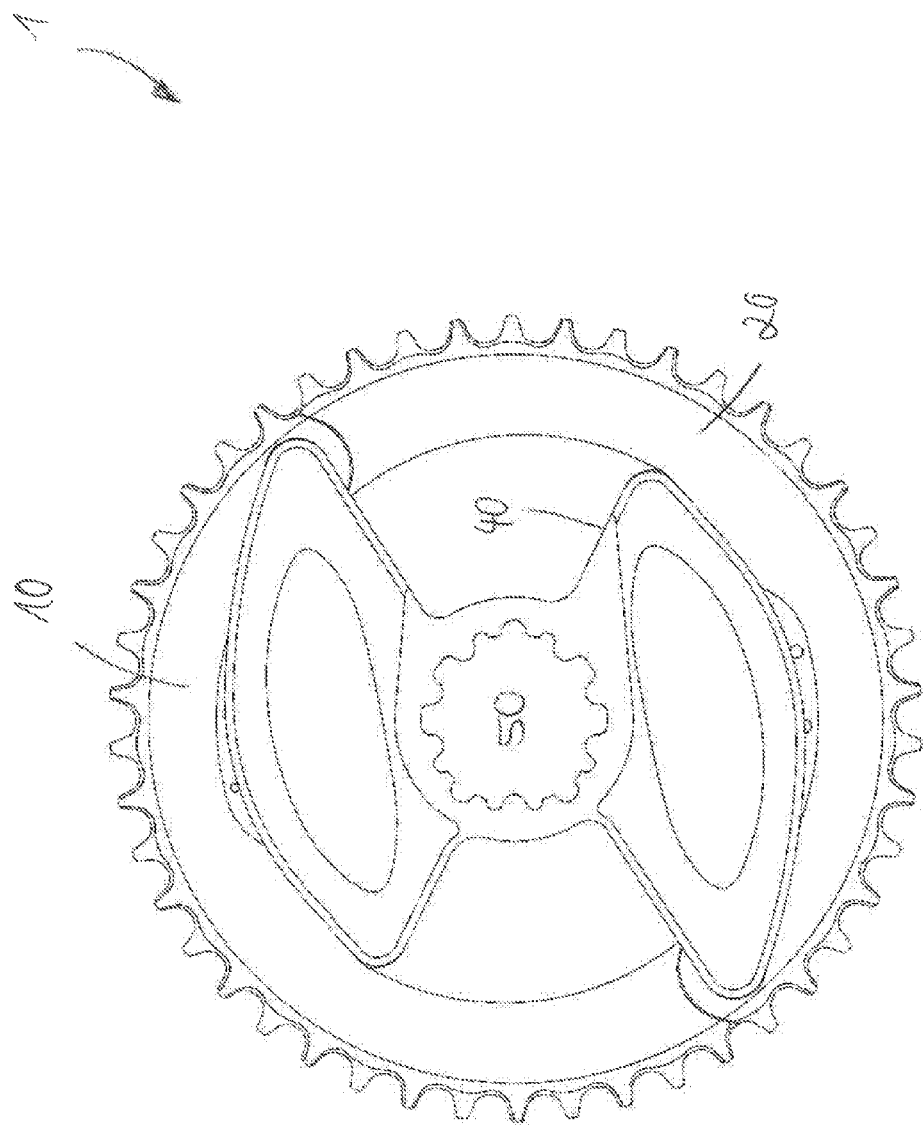
FIG. 6a is an exterior view of the chainring arrangement.
Figure 6B:
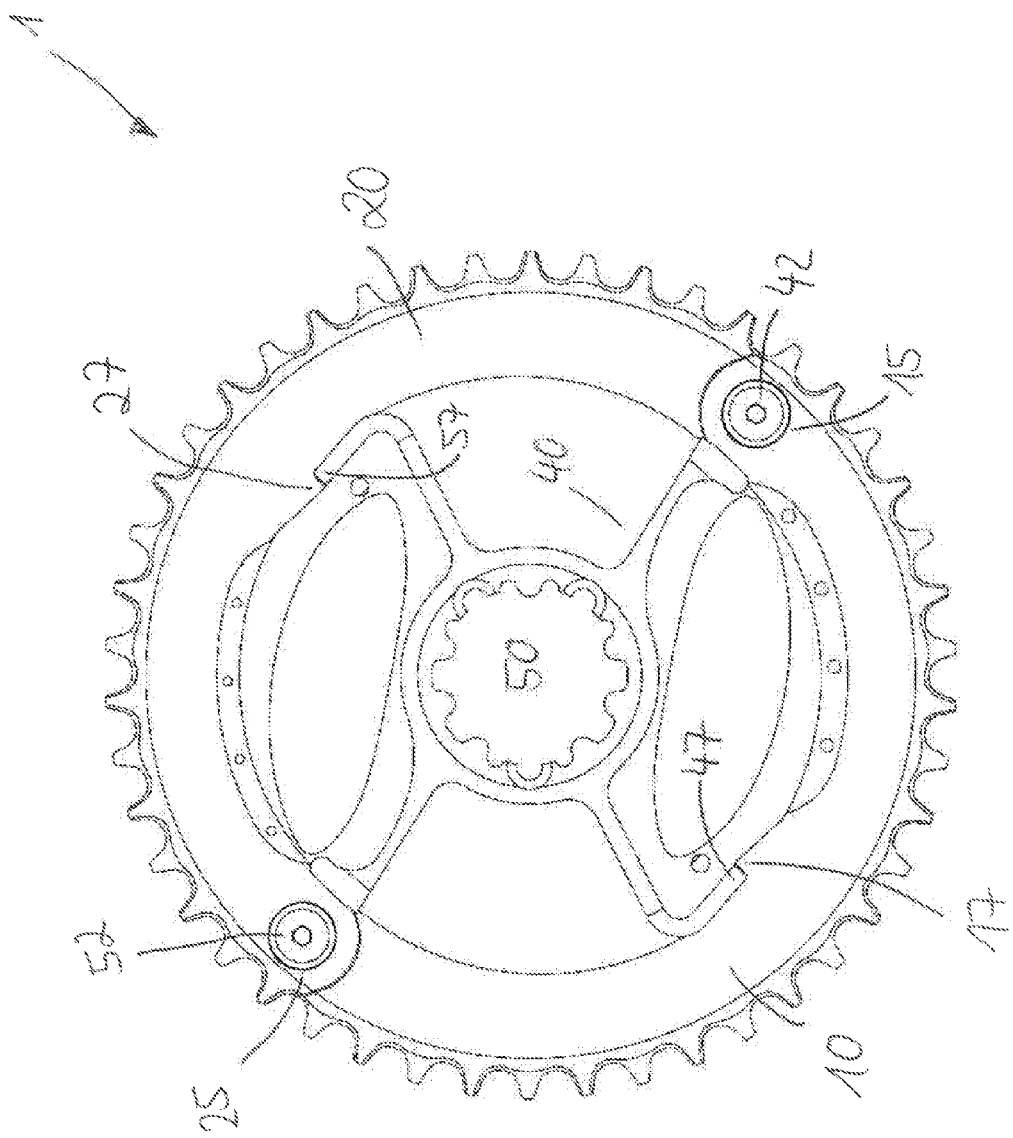

FIGS. 6*a* and 6*b* show an exterior and interior view of the chainring arrangement, consisting of the chainring 1 with a first and second segment 10, 20 and the carrier 40. The segments 10, 20 mesh at their ends and are mounted on the carrier 40, i.e. the studs of the carrier 40 engage in the openings of the segments and the guide surfaces of the segments interact with the guide surfaces of the carrier 40. The carrier 40 comprises a receiving means 50 centrally for a crank. In the embodiment shown, the receiving means 50 comprises a circumferential toothing which can be moved into engagement with a corresponding toothing on the crank so as to transmit torque.

In the interior view in FIG. 6*b*, it can be seen how the studs 42, 52 of the carrier 40 engage in the openings 15, 25 of the segments 10, 20 and thus produce a torque-transmitting connection between the carrier 40 and the segments 10, 20. The segments 10, 20 rest by way of their guide surfaces 16, 26 along their inner circumference on the guide surfaces 46, 56 of the carrier 40 and can be moved along the same in the slide plane. In the circumferential direction, the stops 17, 27 of the segments 10, 20 interact in each case with the stops 47, 57 of the carrier 40 and ensure the torque transmission in the direction of rotation D of the drive.

In an embodiment, each segment is mounted to at least two points on the carrier 40. However, the bearing arrangement can also be realized in a manner other than in the example shown as long as it allows for a relative movement of the segment in relation to the carrier 40.

FIG. 7 shows a schematic exterior view of the chainring arrangement which is situated in engagement with a part-shown drive chain 30. The schematic representation of the chain shows inside plate links (connecting lines between the small rollers on the inside) and outside plate links (connecting lines between the small rollers on the outside). The first and second chainring segments 10, 20 are in each case connected to the carrier 40 at two bearings. The crank 60 is mounted on the carrier 40 in a torque-transmitting manner such that a pedal force of the rider is able to be transmitted from the crank 60 via the carrier 40 to the chainring segments 10, 20 and the drive chain 30.

In the position shown of the crank 60, the second chainring segment 20 is situated in the front half of the bicycle crankset which is situated in engagement with the chain 30. In a corresponding manner, the first chainring segment 10 is situated in the rear half of the crankset, for the most part out of engagement with the drive chain 30. The incoming chain is under tension or load between the front chainring and rear multiple sprocket arrangement (not shown here)—the incoming chain is situated in the load strand 31. The outgoing chain, in contrast, is not under tension or load and is situated in the empty strand 32.

In the position shown, the first chainring segment 10 is in engagement with the chain 30 just by way of the two first teeth on the front end 11. When the segment 10 enters into the load strand 31 of the chain 30 as shown, the axial forces F caused by the skew are transmitted from the chain 30 to the teeth and consequently to the segment 10, not however the tensile forces of the chain. Consequently, the segment 10 that is not yet under load is able to move in the axial direction A. The last teeth on the rear end 12 of the first segment 10 are still in engagement with the chain 30 in said position. Said part of the chain 30 is situated in the empty strand 31 and consequently is not under drive load such that the segment 10 is not loaded either. The last teeth situated in engagement do not transmit any driving load, the chain rollers do not abut against the load flank of the teeth.

If the crank 60 is rotated further in the direction of drive, the first segment 10 is moved into engagement again with the chain 30 at the top. As soon as the load flanks of the teeth of the first segment 10 cooperate with the rollers of the chain 30, they transmit a driving force to the chain 30. The segment 10 is then under load. The more teeth of the chainring segment 10 that are in engagement with the chain 30, the more difficult it can be to move the segment 20 axially. The axial force F of the chain skew is at some point no longer sufficient to move the segment 10 under load in the axial direction.

If the crank 60 is rotated further in the drive direction, the above-described is repeated with the second chainring segment 20. Just when the segment 20 enters into the load strand 31 of the chain 30, the axial forces F of the chain 30 are transmitted to the segment 20 which is not yet under load and move it in an axial direction A that is dependent on the skew.

The movement of the segments 10, 20 relative to one another is delimited by the clearance in the connection at their ends. Both the first segment 10 and the second segment 20 make such a relative movement in the axial direction A per crank rotation. This means that the chainring is displaced in two steps (in each case when entering the segments) per crank rotation. The displacement of the segments or of the chainring takes place as long as an axial force F acts on the segments, that is to say as long as the chain is situated in skew. If the ideal chain line has been achieved, no more axial forces F are transmitted to the teeth of the segments and the chainring remains in said position.

Figure 8:
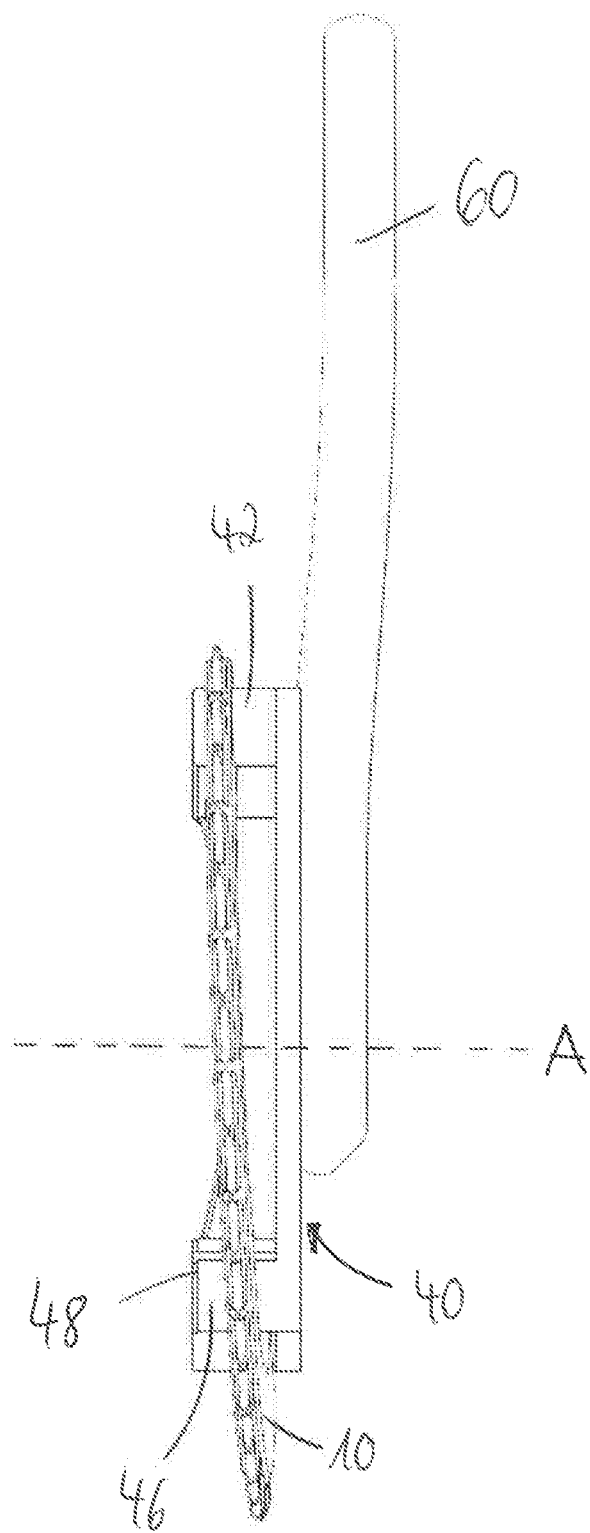
FIG. 8 is a representation to illustrate the tilting movement.

FIG. 8 shows a side view of the chainring arrangement with the crank 60, the segment 10 being tilted in relation to the carrier 40. For better visualization, the tilting here is shown severely exaggerated over the entire chainring segment. The tilting is made possible by the development of the chainring segments 10, 20. The openings 15, 25 in the segments 10, 20 preferably comprise inclinations 18, 28 to this end. The studs 42, 52 of the carrier 40 engage in the opening, the inclinations allowing the segments 10, 20 to be tilted in relation to the carrier 40. The inclinations can be seen the best in FIGS. 4a and 4b. In the position shown, the segment 10 has moved out of the vertical and is at an angle thereto. Depending on the skew of the chain, the segments 10, 20 tilt inward or outward. In the example shown, the segment 10 is tilted inward, which points to an inward skew of the chain, that is to say shifting on the rear multiple sprocket arrangement from a smaller sprocket to a larger one. The tilting of the segments 10, 20 in relation to the carrier 40 supports the gradual displacement of the chainring. The inward tilting shown here therefore accelerates the movement of the chainring along the rotational axis A. Two movements therefore take place—a tilting movement of the segment 10 in relation to the stud 42 of the carrier 40 and an axial movement or sliding movement of the segment 10 along the guide surface 46 of the carrier 40. The corresponding tilt or pivot axis and the slide plane are shown in FIG. 5a.

An axial stop 48 on the carrier 40 can also be seen in said view. Said stop delimits the axial movement inward of the segments and prevents the segments from falling from the carrier 40.

Figure 9A:
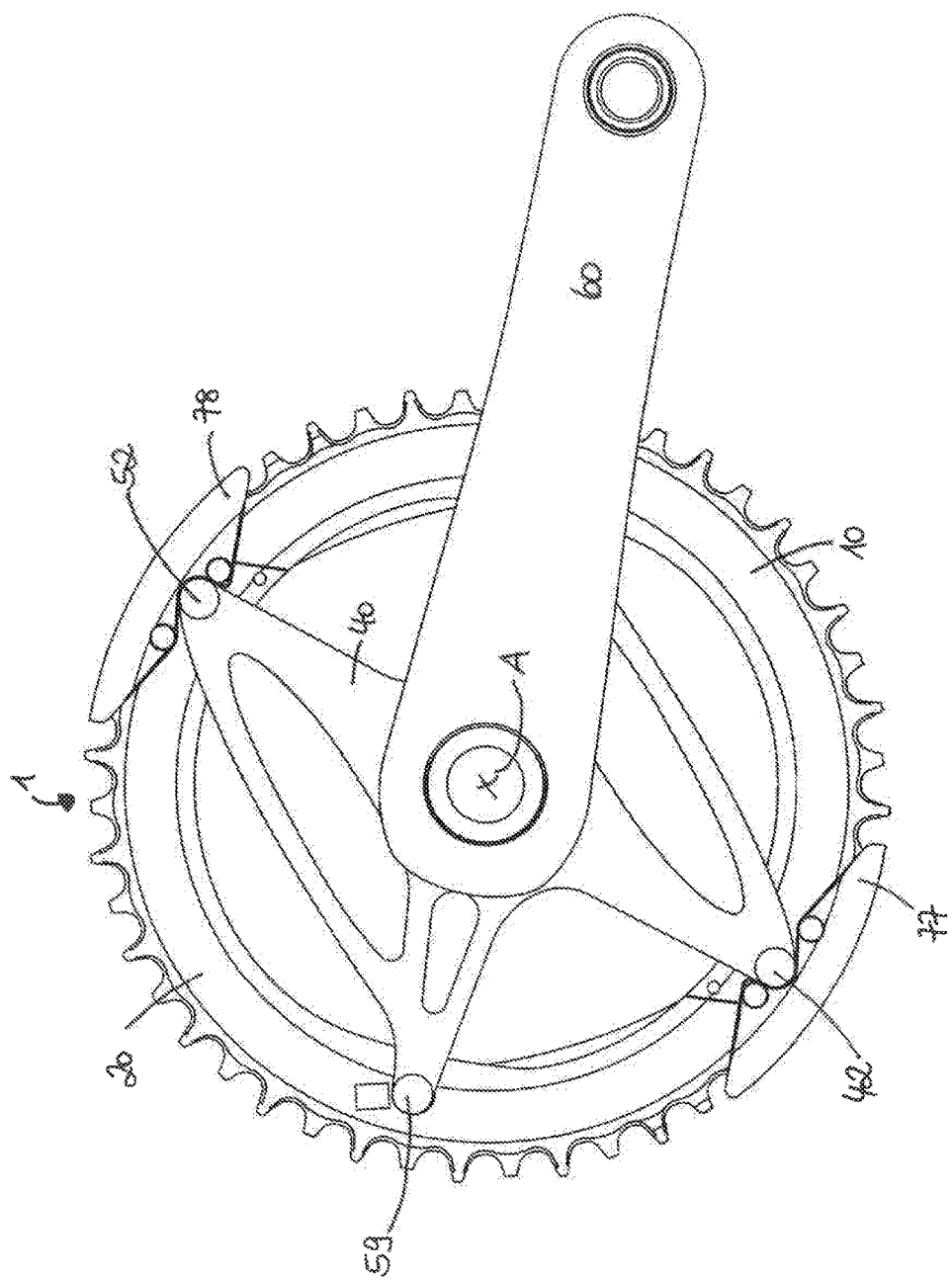
FIG. 9a is an exterior view of a second embodiment of the chainring arrangement with a mounted crank.
Figure 9B:
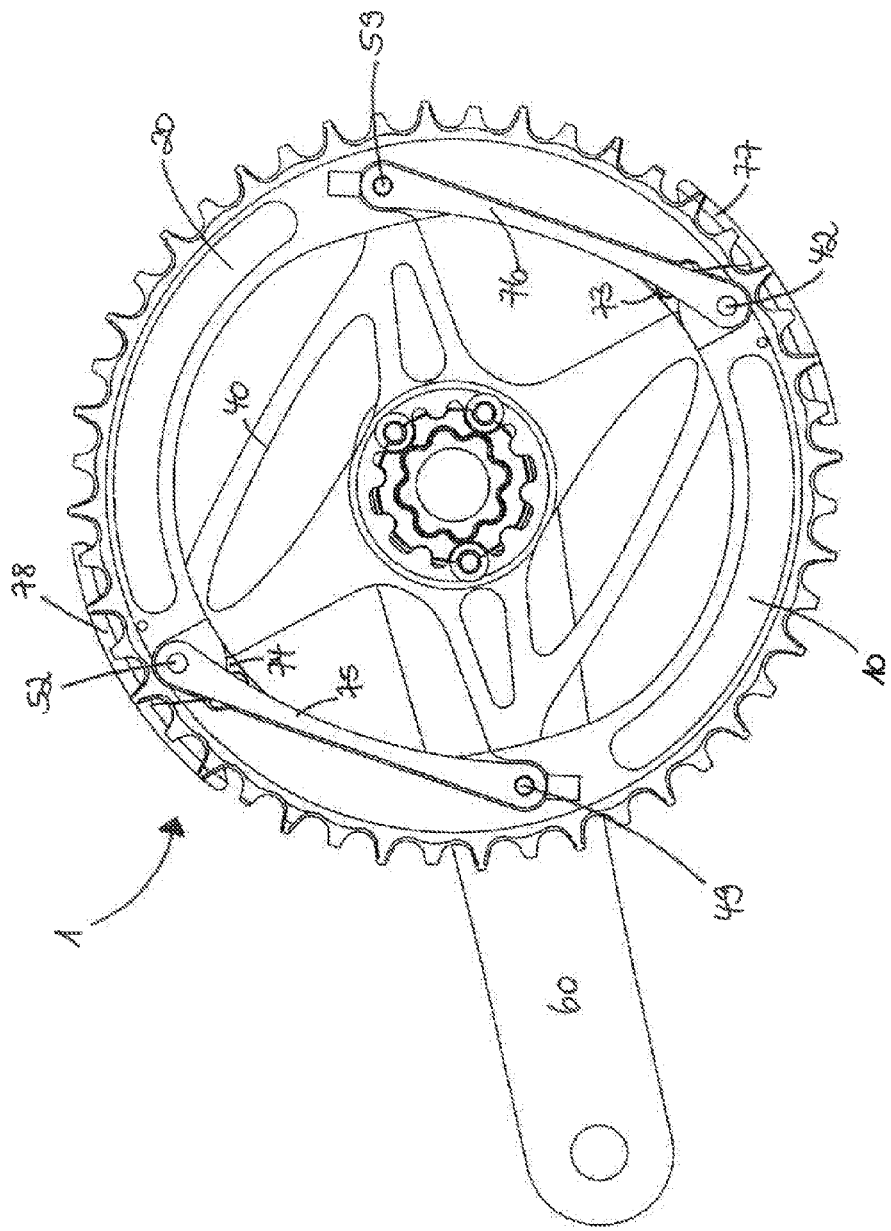
Figure 9E:
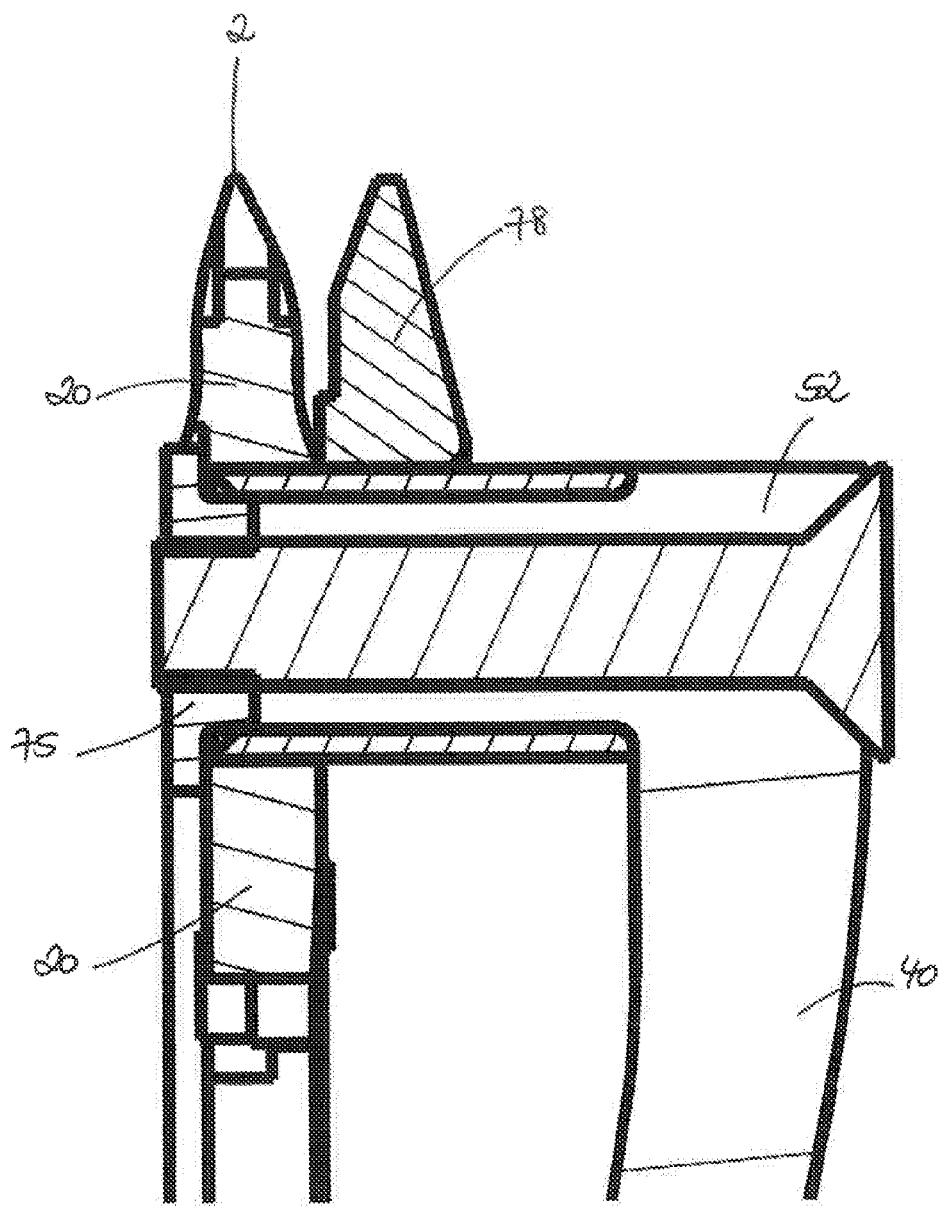
FIG. 9e is an enlarged view of a detail from FIG. 9c

FIGS. 9 a, b, c, and d show a crankset with a second embodiment of the chainring and the corresponding chainring arrangement.

For parts which differ only insignificantly from the first embodiment in form and function, the same reference symbols are used.

FIG. 9a is an exterior view of the chainring arrangement with a chainring which also consists of two chainring segments 10', 20' which are movably connected together at their ends. The ends of the segments 10', 20' also interlock, however the recess this time is realized by the support element 77, 78 on the outside surface and by a lug 73, 74 on the inside surface, in which the end of the segment engages. The segments 10', 20' are connected to two counter bearings on the carrier 40' at in each case two bearing elements such that they are able to be moved relative to it in the axial direction A. The carrier 40' comprises four studs 42, 52, 49, 59. Two studs 42, 49 of the carrier 40' engage in two openings of the first segment 10' and two studs 52, 59 of the carrier 40' engage in two openings of the second segment 20'. The studs 9, 59 provide in each case a second counter bearing for the segments 10', 20' and replace the guide surfaces of the first embodiment.

The segments 10', 20' comprise a support element 77, 78 in each case on their front ends. The support elements 77, 78 are either fixedly connected to the segments 10', 20' or are integrally realized with said segments. In the example shown, the support elements 77, 78 are riveted twice in each case with the chainring segments 10', 20'.

FIG. 9b shows in the interior view that the two segments 10', 20' are additionally connected by means of stabilizing elements 75, 76. The stabilizing elements 75, 76 serve for reinforcing the carrier 40' and at the same time provide the inner axial stop for the segments 10', 20'.

FIGS. 9c and 9d show sections and corresponding exterior views through the crankset—cut once along the line C-C through the studs 42, 52 and once along the line D-D through the studs 49, 59.

FIG. 9c shows the arrangement of the support elements 77, 78 axially offset next to the teeth 2 of the segments 10', 20'.

FIG. 9d provides an enlarged view of a detail from FIG. 9c. The tooth 2 of the second segment 20' is realized asymmetrically. The tooth tip is not arranged centrally, but is offset to the centre. As a result of the enlarged chamfer on the right-hand or outer surface of the tooth 2, there is improved functioning when the tooth 2 slides into the drive chain and consequently for the axial displacement inward or to the left of the chainring segment 20'. The reduced function of the left-hand or inner chamfer of the tooth is compensated at least in part by the function of the support element 78. The support element 78 is mounted in such a way on the segment 20' that the outwardly pointing chain plates of a chain moved into engagement with the tooth 2 engage between the tooth 2 and the support 78. A chain that is situated in skew would consequently transmit axial forces F not only to the teeth of the chainring or to its segments, but also to the support element. Put more precisely, the axial forces F of the drive chain are transmitted to the teeth of the segments, by the inner surfaces of the chain plates cooperating with the tooth. Depending on the skew, the inner surfaces of the chain plates press against either the inner (facing the bicycle frame) or the outer (facing away from the bicycle frame) side of the tooth. The outer surfaces of the chain additionally press against the support element. In the embodiment shown, the support elements 77, 78 are only mounted on one side of the segment for reasons of space—namely on the outside surface such that only the chain skew acts on the support element 78 in said one direction. The axial movement of the chainring is consequently additionally supported. An alignment of the chain corresponding to the chain position on the rear sprockets is accelerated and the ideal chain line is produced more quickly.

Figure 10A:
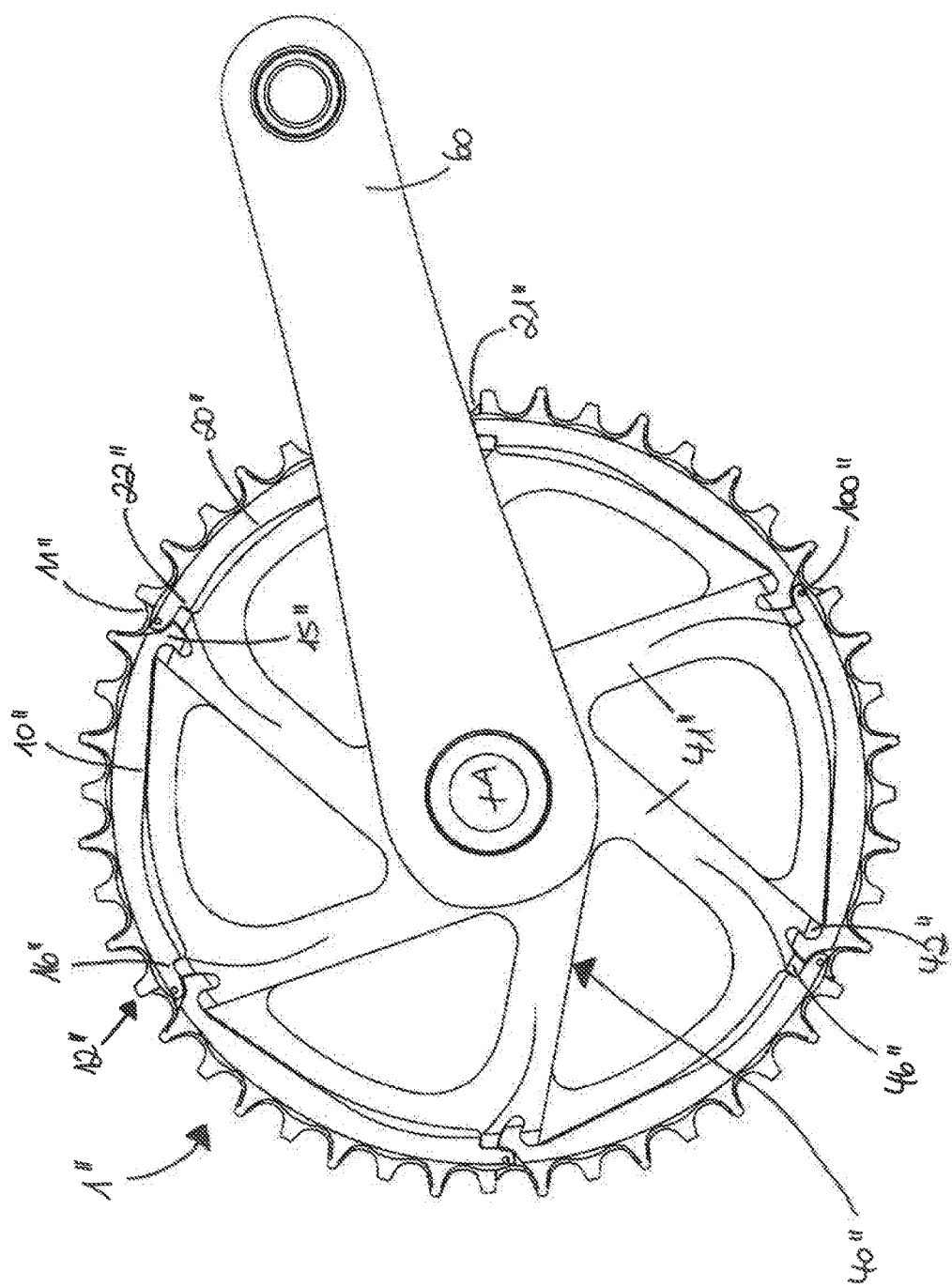
FIG. 10a is an exterior view of a third embodiment of the chainring arrangement with a mounted crank.
Figure 10:
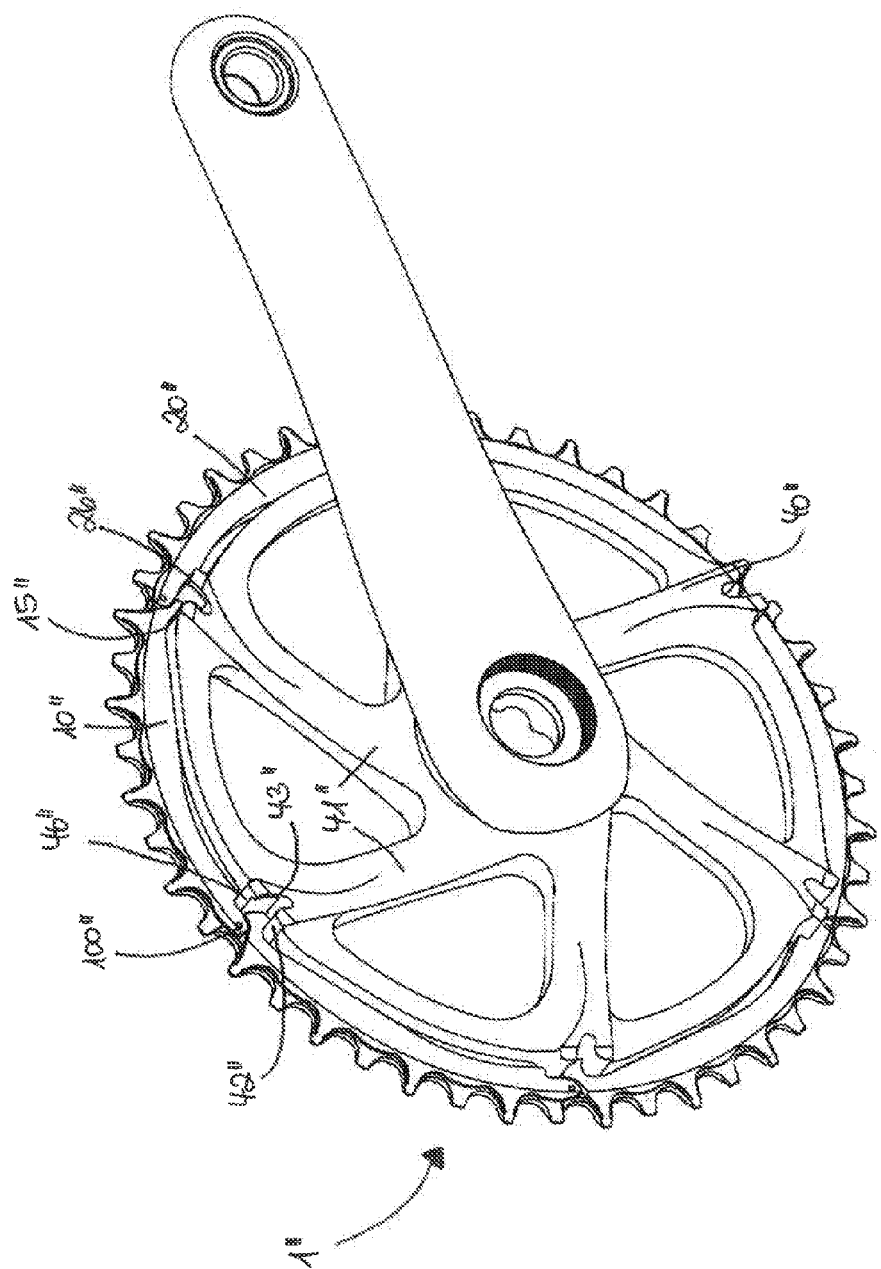

FIG. 10a shows an exterior view of a third embodiment of a chainring arrangement. In contrast to the previous realizations, the chainring 1" consists of six segments 10", 20". The operating principle remains basically the same, irrespective of the number of segments. Adjacent segments are connected together at their ends 11", 22" in each case so as to be movable in the axial direction. The axial clearance between the ends 11", 22" allows the segments 10", 20" to be moved relative to one another. The segments are moved with every crank rotation in each case when running into the drive chain in the direction of the skew of the chain (as explained in conjunction with FIG. 7). Where there are six segments, six small movement steps take place per crank rotation. Said movement steps of the segments result in an axial movement of the entire chainring 1" along the carrier 40".

In said embodiment, the carrier 40 comprises six identical arms 41". Each arm 41" comprises two counter bearings 42" and 46" on its radially outer end. The first counter bearing 42" interacts in each case with the first bearing element 15", 25" at the front end 11", 21" of a segment 10", 20". In this case, the segment encompasses the end of the arm 41" such that, on the one hand, a torque is transmitted from the carrier 40" to the chainring 1", and, on the other hand, the segment is able to move in the axial direction A relative to the carrier 40". The first bearing element on the segment is realized, in this case, as a combination of an opening and a guide surface. The corresponding counter bearing on the carrier 40" is realized as a combination of a stud and a guide surface. The second counter bearing 46" of the carrier 40" interacts with the second bearing element 6", 26" on the rear end 12", 22" of a segment 10", 20". The second bearing element and the second counter bearing are realized in each case as guide surfaces. The guide surfaces of the segments slide along the guide surfaces on the carrier 40 in the axial direction A. The arms 41" are connected together on their radially outwardly pointing ends. This increases the stability, but is not absolutely necessary. In each case the ends of adjacent segments are movably connected together by means of a projection 13", 23" and a recess 14", 24" in the direction of the rotational axis A. In each case, a front end of a segment engages in the rear end of an adjacent segment. A clearance between the projection and the recess enables a relative movement between the adjacent segments.

In addition to said movable connection, the facing ends of adjacent segments 10", 20" are connected in each case by way of a pin 100. The additional connection by means of a pin 100 is realized such that the adjacent segments can certainly move relative to one another in the axial direction, cannot however come out of engagement in the radial direction. As shown, this can be realized by a pin 100 penetrating both the front end 11" of a segment 10" and the rear end 22" of the adjacent segment 20". In this case, the pin 100 is pressed into the two holes in the rear end 22" of the segment 20" (press fit). A further hole in the front end 11" is realized greater than the diameter of the pin 100 (clearance fit) such that the first segment 10" is able to move relative to the second segment 20". The pin 100 prevents the segments coming loose from the carrier 40" in an unwanted manner. This is particularly significant when the segments are not in engagement with the drive chain and consequently are not held on the carrier 40 by said drive chain.

FIGS. 10b and 10c show the perspective exterior and interior views of the third embodiment. The position shown shows the chainring on the inner axial stop (concealed in the position), in which the chainring has aligned with one of the largest rear sprockets in the axial direction. Correspondingly, the outer axial stop 43" would be reached when the chainring 1" is aligned with one of the smallest rear sprockets.

In principle, the inner and/or outer axial stops could also be realized so as to be adjustable. Such adjustable stops would allow the maximum axial movement of the chainring to be adapted to variously wide rear multiple sprocket arrangements. In the case of a very wide multiple sprocket arrangement with a large number of 12 or more sprockets, the chainring has to complete a larger axial movement along the rotational axis than in the case of a narrow multiple sprocket arrangement with a small number of sprockets.

The component parts of the chainring arrangement are preferably produced from materials such as steel, titanium or aluminium—with or without alloys. Other materials, in particular lighter ones, are also conceivable. For example, the support elements are preferably produced from a plastic material, in particular a thermoplastic material such as polystyrene or polyamide, which is simple to shape. The plastics material can also be glass-fibre reinforced plastic material. The combination of metallic and thermoplastic materials is advantageous with reference to the weight and the noise development. It would be advantageous to provide generally adjustable and also non-adjustable stops with damping elements produced from rubber or plastics material in order to avoid noise when the chainring makes contact.

In order to protect the parts that move relative to one another from contamination and consequently to ensure fault-free functionality, the drive can comprise a casing or cover. The cover prevents or reduces the ingress of foreign bodies such as dirt, dust and water. In particular the movable connections between adjacent segments and the bearings between the segments and the carrier should be protected from contamination. A dirt-impermeable casing or cover would be significant in particular in said regions.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A chainring for a chainring arrangement for a bicycle, the chainring comprising:
   a first chainring segment comprising a first plurality of teeth along a first outer circumference and configured to rotate about a rotational axis, the first chainring segment having a first front end and a first rear end in a circumferential direction; and
   a second chainring segment comprising a second plurality of teeth along a second outer circumference and configured to be rotatable about the rotational axis, the second chainring segment having a second front end and a second rear end in the circumferential direction;
   wherein:
   the first front end of the first chainring segment and the second rear end of the second chainring segment are configured to be movably connected such that the first chainring segment and the second chainring segment are displaceable relative to one another in an axial direction of the rotational axis, and
   wherein the first plurality of teeth and the second plurality of teeth form a third plurality of teeth along the outer circumference of the first and second chain ring segments for engaging in a drive chain.

2. The chainring according to claim 1, wherein the first chainring segment further comprises a projection on its first front end, and the second chainring segment further comprises a recess on its second rear end, and the first and second chainring segments are further configured to mesh together by engagement of the projection engaging and the recess.

3. The chainring according to claim 2, wherein a width of the projection is smaller than a width of the recess to allow relative movement between the first chainring segment and the second chainring segment in the axial direction of the rotational axis.

4. The chainring according to claim 1, wherein the first or second chainring segment is displaced in the axial direction of the rotational axis by an axial force from a drive chain when the drive chain engages the first or second plurality of teeth in skew.

5. The chainring according to claim 1, wherein the first and second pluralities of teeth comprise first teeth and second teeth which alternate in thickness.

6. The chainring according to claim 5, wherein the first and the second chainring segments are realized in an identical manner.

7. The chainring according to claim 1, wherein the first and the second chainring segments each further comprise a support element configured to be axially offset from the first and the second front ends.

8. The chainring according to claim 1, wherein the first rear end of the first chainring segment and the second front end of the second chainring segment are movably connected.

9. A crankset for a bicycle including a chainring arrangement, the chainring arrangement comprising:
   a first chainring segment comprising a first plurality of teeth along a first outer circumference and configured to rotate about a rotational axis;
   a second chainring segment comprising a second plurality of teeth along a second outer circumference and configured to be rotatable about the rotational axis;
   wherein:
   the first chainring segment further comprising a first front end and a first rear end in a circumferential direction,
   the second chainring segment further comprising a second front end and a second rear end in the circumferential direction, and
   the first front end of the first chainring segment and the second rear end of the second chainring segment are configured to be movably connected such that the first chainring segment and the second chainring segment are displaceable relative to one another in an axial direction of the rotational axis; and
   wherein the crankset further comprises a carrier configured to be rotatably fastened about the rotational axis and for connecting the chainring to a crank in a torque-transmitting manner, and wherein the chainring is mounted on the carrier so as to be movable in order to enable a movement of the chainring relative to the carrier in the axial direction of the rotational axis.

10. The crankset according to claim 9, wherein the first and the second chainring segments each comprise a first bearing element.

11. The crankset according to claim 10, wherein the first bearing element is an opening, a guide surface, or a stud.

12. The crankset according to claim 11, wherein the first and the second chainring segments each comprise a second bearing element.

13. The crankset according to claim 12, wherein the carrier comprises:
    a first arm and a third arm, each with a first counter bearing; and
    a second arm and a fourth arm, each with a second counter bearing.

14. The crankset according to claim 13, wherein the first and second counter bearings are each realized as an opening, a guide surface, or a stud.

15. The crankset according to claim 14, wherein:
    the first bearing element of the chainring segment is configured to engage with the first counter bearing of the carrier through interaction of a stud and an opening; and
    a diameter of the stud is smaller than a diameter of the opening in order to enable the movement of the chainring relative to the carrier in the axial direction of the rotational axis.

16. The crankset according to claim 15, wherein the opening comprises an inclination in order to enable the chainring segment to tilt relative to the carrier.

17. The crankset according to claim 14, wherein the second bearing element of the chainring segment comprises a guide surface configured to engage with a guide surface of the second counter bearing of the carrier, and wherein the guide surface of the chainring segment moves along the guide surface of the carrier in the axial direction of the rotational axis.

18. The crankset according to claim 9, wherein the chainring arrangement is a single chainring.

19. A drive arrangement for a bicycle, the drive arrangement comprising:
    a first chainring segment comprising a first plurality of teeth along a first outer circumference and configured to rotate about a rotational axis;
    a second chainring segment comprising a second plurality of teeth along a second outer circumference and configured to be rotatable about the rotational axis;
    wherein:

the first chainring segment further comprises a first front end and a first rear end in a circumferential direction, the second chainring segment further comprises a second front end and a second rear end in the circumferential direction, and the first front end of the first chainring segment and the second rear end of the second chainring segment are configured to be movably connected such that the first chainring segment and the second chainring segment are displaceable relative to one another in an axial direction of the rotational axis; and a multiple sprocket arrangement for a rear wheel hub;

a drive chain for engaging a chainring of the chainring arrangement and a sprocket of the multiple sprocket arrangement and for transmitting a driving force from the chainring arrangement to the multiple sprocket arrangement; and a rear derailleur for positioning the drive chain on one of the sprockets of the multiple sprocket arrangement; wherein the chainring of the chainring arrangement is configured to align with the position of the drive chain on the multiple sprocket arrangement along the rotational axis.

20. The drive arrangement according to claim 19, wherein the multiple sprocket arrangement comprises at least eleven sprockets.

21. The drive arrangement according to claim 19, wherein the multiple sprocket arrangement comprises at least one sprocket with first teeth and second teeth which alternate and are different from one another.

* * * * *